(12) United States Patent
Eberlein et al.

(10) Patent No.: US 10,419,445 B2
(45) Date of Patent: Sep. 17, 2019

(54) CREDENTIAL CHANGE MANAGEMENT SYSTEM

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 254 days.

(21) Appl. No.: 15/640,716

(22) Filed: Jul. 3, 2017

(65) Prior Publication Data

US 2019/0007420 A1 Jan. 3, 2019

(51) Int. Cl.
H04L 29/06 (2006.01)

(52) U.S. Cl.
CPC ........ H04L 63/108 (2013.01); H04L 63/0846 (2013.01); H04L 63/1425 (2013.01)

(58) Field of Classification Search
CPC . H04L 63/083; H04L 63/0846; H04L 63/108; H04L 63/20
See application file for complete search history.

(56) References Cited

U.S. PATENT DOCUMENTS

| | | | |
|---|---|---|---|
| 7,353,536 B1 * | 4/2008 | Morris | G06F 21/31 709/203 |
| 8,424,067 B2 * | 4/2013 | Keohane | H04L 63/0846 713/182 |
| 9,699,173 B1 * | 7/2017 | Roth | H04L 63/0846 |
| 2004/0177272 A1 * | 9/2004 | Walters | G06F 21/46 713/183 |
| 2005/0114673 A1 * | 5/2005 | Raikar | G06F 21/46 713/182 |
| 2006/0041756 A1 * | 2/2006 | Ashok | G06F 21/31 713/183 |
| 2007/0130319 A1 * | 6/2007 | Tse | H04L 41/042 709/224 |
| 2009/0260050 A1 * | 10/2009 | George | G06F 21/53 726/1 |
| 2011/0271118 A1 * | 11/2011 | Mahmoud Abd Alla | G06F 21/31 713/183 |
| 2012/0060213 A1 * | 3/2012 | Childress | G06F 21/31 726/18 |
| 2015/0242862 A1 * | 8/2015 | Rupple | G06Q 30/018 705/317 |
| 2016/0301533 A1 * | 10/2016 | Mishra | H04L 9/3271 |
| 2017/0187703 A1 * | 6/2017 | Enrique Salpico | G06F 21/44 |
| 2017/0208075 A1 * | 7/2017 | Kerametlian | H04L 63/083 |

* cited by examiner

*Primary Examiner* — Eric Shepperd
(74) *Attorney, Agent, or Firm* — Buckley, Maschoff & Talwalkar LLC

(57) ABSTRACT

A credential change management platform may, from a time period T1 to T2: deny access by remote client devices that submit credentials other than the prior or new credentials and, as a result of the denial, increment a lock-out counter, and allow access by devices that submit either the prior or new credential. From T2 to T3, the platform may: deny access by devices that submit credentials other than the prior or new credential and, as a result of the denial, increment the lock-out counter, deny access by devices that submit the prior credential without incrementing the lock-out counter, and allow access by devices that submit the new credential. After T3, the platform may: deny access by devices that submit credentials other than the new credential and, as a result of the denial, increment the lock-out counter, and allow access by devices that submit the new credential.

20 Claims, 22 Drawing Sheets

CREDENTIAL CHANGE MANAGEMENT SYSTEM

BACKGROUND

The subject matter disclosed herein relates to computer system security credentials, and more particularly, to change management associated with security credentials.

In some cases, a service or computer system access requires that remote client devices present appropriate security credentials (e.g., a username and password). Moreover, the security credentials might occasionally be changed. For example, enterprise security guidelines may require that a password is changed for a newly created user. Similarly, passwords of existing users might need to be changed after a certain period of time (e.g., every three months) to enhance security. As still another example, a credential might need to be changed when an enterprise suspects that it has become known to unauthorized users (e.g., after a computer system is "hacked").

Note that a service or computer system might be used by a substantial number of consumers. Moreover, in some systems a password might be securely stored locally at a consumer device (e.g., to allow for automatic calls of the service). Further, consumers might typically call a service at regular intervals and/or upon an occurrence of an event, and that such calls might occur at a relatively high frequency.

When the password of a service is changed, the new password must be provided to all consumers (otherwise they will not be able to logon). Because consumers might be calling the service automatically, potentially at a high frequency, a situation can arise where a service receives a call with an invalid password (that is, an old password instead of a new password). Some systems also have a "failed-login-counter" such that an account may be automatically disabled after a number of failed login attempts exceeds a predetermined threshold value (e.g., an account might be suspended after five unsuccessful login attempts).

Thus, when a single service is used by several consumers with a high frequency, a password change for the service might inadvertently lead to a locked account if a new password is not provided quickly enough to all consumers. It would therefore be desirable to provide systems and methods to facilitate management of security credential changes in an accurate and efficient fashion.

SUMMARY

According to some embodiments, a credential data store containing electronic records associated with security credentials, the electronic records including at least a prior credential expiring at time T1 and a new credential effective beginning at time T1. A communication port may exchange information with a plurality of remote client devices, and a credential change management platform may, during a first transitional time period from time T1 to time T2: deny access by remote client devices that submit credentials other than the prior credential or the new credential (and, as a result of the denial, increment a lock-out counter), and allow access by remote client devices that submit either the prior credential or the new credential. During a second transitional time period from time T2 to time T3, the platform may: deny access by remote client devices that submit credentials other than the prior credential or the new credential (and, as a result of the denial, increment the lock-out counter), deny access by remote client devices that submit the prior credential without incrementing the lock-out counter, and allow access by remote client devices that submit the new credential. During a third time period after time T3, the platform may: deny access by remote client devices that submit credentials other than the new credential (and, as a result of the denial, increment the lock-out counter), and allow access by remote client devices that submit the new credential.

Some embodiments comprise: during a first transitional time period from time T1 to time T2: means for denying access by remote client devices that submit credentials other than the prior credential or the new credential and, as a result of the denial, increment a lock-out counter, and means for allowing access by remote client devices that submit either the prior credential or the new credential; during a second transitional time period from time T2 to time T3: means for denying access by remote client devices that submit credentials other than the prior credential or the new credential and, as a result of the denial, increment the lock-out counter, means for denying access by remote client devices that submit the prior credential without incrementing the lock-out counter, and means for allowing access by remote client devices that submit the new credential; and during a third time period after time T3: means for denying access by remote client devices that submit credentials other than the new credential and, as a result of the denial, increment the lock-out counter, and means for allowing access by remote client devices that submit the new credential.

Technical advantages of some embodiments disclosed herein include improved systems and methods to facilitate management of security credential changes in an accurate and efficient fashion.

DETAILED DESCRIPTION

Figure 1:
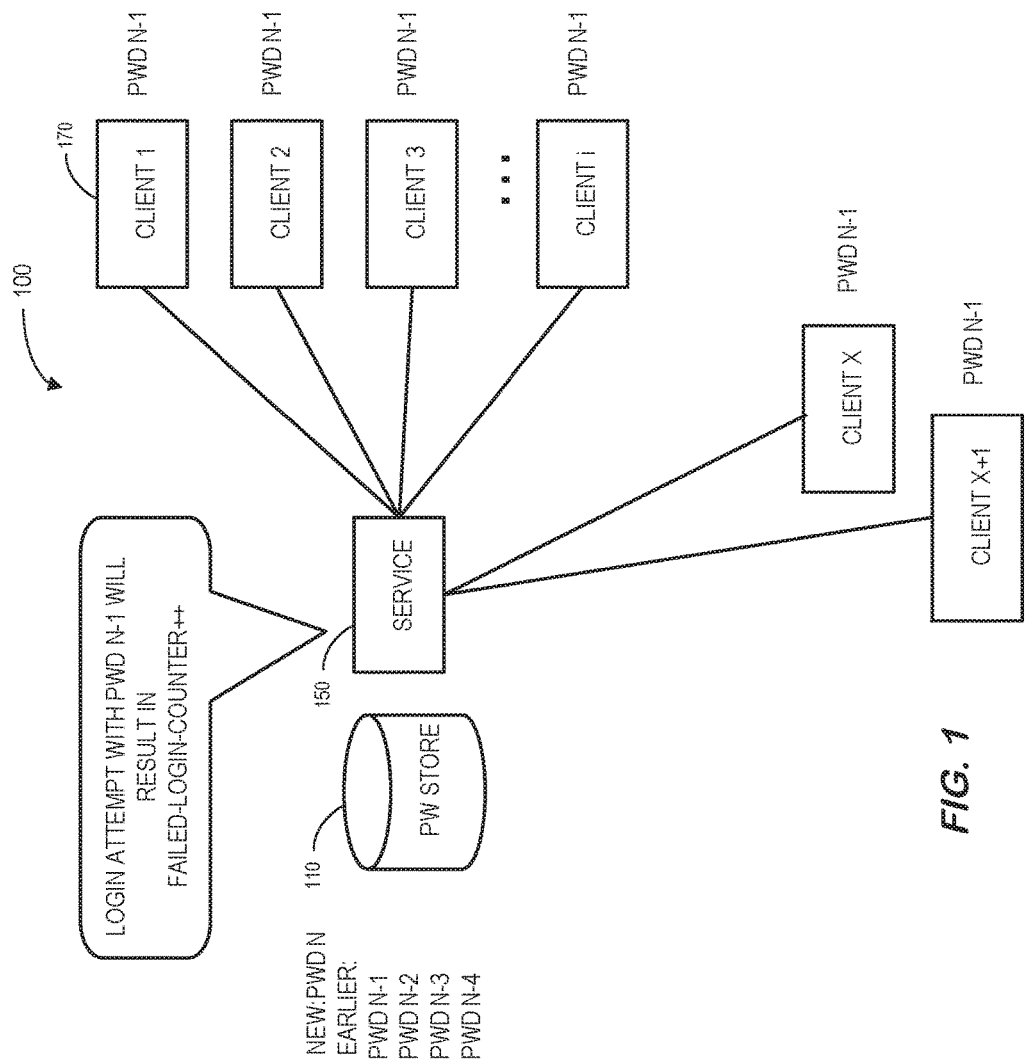
FIG. 1 is a system for credential change management.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Some embodiments described herein relate to providing management of security credential changes. Such embodiments may be useful, for example, when a service or computer system access requires that remote client devices present appropriate security credentials. As used herein, the phrase "security credentials" might refer to any data or token that can be presented and verified, such as a user and password. In some cases, enterprise security guidelines may require that a password is changed for a newly created user. Similarly, passwords of existing users might need to be changed after a certain period of time (e.g., every six months) to enhance security. As still another example, a credential might need to be changed when an enterprise suspects that it has become known to unauthorized users (e.g., after a computer system is "hacked").

In some cases, a service or computer system might be used by a substantial number of consumers. Note that some services may be accessed by multiple people who present themselves as a single technical user (e.g., a help desk entity). Moreover, in some systems a password might be securely stored locally at a consumer device (e.g., to allow for automatic calls of the service). Note that consumers might typically call a service at regular intervals and/or upon an occurrence of an event, and that such calls might occur at a relatively high frequency. By ways of examples only, a service might be associated with HANA® database created by SAP® (and the consumers might be application server instances, deployment tools, management infrastructure, data replication services, etc.).

Similar situations may arise when a technical user role is assigned to a new person. For example, in cloud operations technical users of a system might potentially be assigned temporarily to various people to provide operation and support. That is, multiple users might act as a single technical user (to avoid the creation of new technical users). In this case, a password may be changed to help ensure that only one person has access to the system and/or so that the actions of different people do not interfere with each other. Such an approach might also make it clear who logged into the system for audit reasons.

When the password of a service is changed, the new password must be provided to all consumers (otherwise they will not be able to logon). Because consumers might be calling the service automatically, potentially at a high frequency, a situation can arise where a service receives a call with an invalid password (that is, an old password instead of a new password). Also note that some systems have a "failed-login-counter" such that an account may be automatically disabled after a number of failed login attempts exceeds a pre-determined threshold value (e.g., an account might be suspended after five unsuccessful login attempts).

Thus, when a single service is used by several consumers with a high frequency, a password change for the service might inadvertently lead to a locked account if a new password is not provided quickly enough to all consumers. Consider, for example, FIG. 1 which is a system 100 for credential change management. The system 100 includes a service 150 and associated password store 110 containing a new password "PWD N" that will replace an older password "PWD N−1." As illustrated in FIG. 1, various clients 170 (e.g., 1 through i, X, and X+1) might still be using the older password and failed login attempts will result in a failed-login-counter being incremented. When the failed-login-counter reaches a pre-determined threshold, such as three failed logins, the account might be locked (e.g., the client may need to contact an administrator to have the account re-activated).

One approach to distributing the new password to clients 170 would be to temporarily stop the clients 170 from sending requests to the service 150. The password may then be updated at the service 150 and provided to every client 170. After all clients 170 receive the new password, they can again be allowed to access the service 150. Note, however, that such an approach will cause downtime for consumers. Moreover, it might not necessarily be known which clients 170 will even call the service (e.g., the clients 170 might be de-centrally managed or associated with new users).

Figure 2:
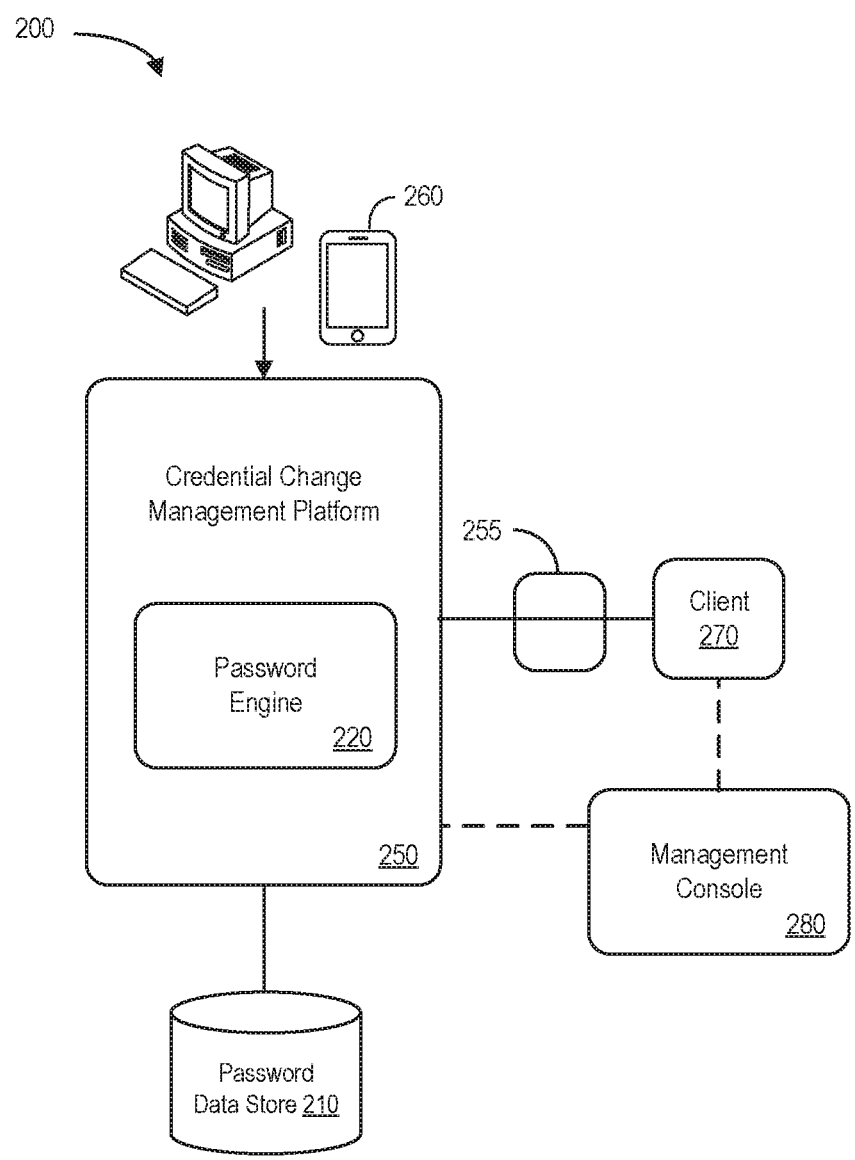
FIG. 2 is a high-level block diagram of a credential change management system in accordance with some embodiments.

It is therefore desirable to provide systems and methods to facilitate management of security credential changes in an accurate and efficient fashion. FIG. 2 is a high-level block diagram of a system 200 according to some embodiments of the present invention. The system 200 includes a credential change management platform 250 that may access information in a password data store 210 (e.g., storing a set of electronic records representing a current password and prior passwords). The credential change management platform 250 may also exchange information with remote client devices 270 (e.g., via a firewall 255). According to some embodiments, the credential change management platform 250 may communicate with the client devices 270, access information in the password data store 210, receive instructions from an administrator device 260, execute a password engine 220, and/or exchange data with a management console 280. Note that the credential change management platform 250 might in some cases be associated with a third party, such as a vendor that performs a service for an enterprise.

The credential change management platform 250 might be, for example, associated with a Personal Computer ("PC"), laptop computer, smartphone, an enterprise server, a server farm, and/or a database or similar storage devices. According to some embodiments, an "automated" credential change management platform 250 may automatically facilitate password updates. As used herein, the term "automated" may refer to, for example, actions that can be performed with little (or no) intervention by a human.

As used herein, devices, including those associated with the credential change management platform 250 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The credential change management platform 250 may store information into and/or retrieve information from the password data store 210. The password data store 210 may contain data that was downloaded, that was originally input via an administrator device 260, that was randomly generated by the credential change management platform 250, etc. The password data store 210 may be locally stored or reside remote from the credential change management platform 250. As will be described further below, the password data store 210 may be used by the credential change management platform 250 to control access by remote client devices 720. Although a single credential change management platform 250 is shown in FIG. 2, any number of such devices may be included. Moreover, various devices described herein might be combined according to embodiments of the present invention. For example, in some embodiments, the credential change management platform 250, password data store 210 and/or the management console 280 be co-located and/or may comprise a single apparatus.

Figure 3:
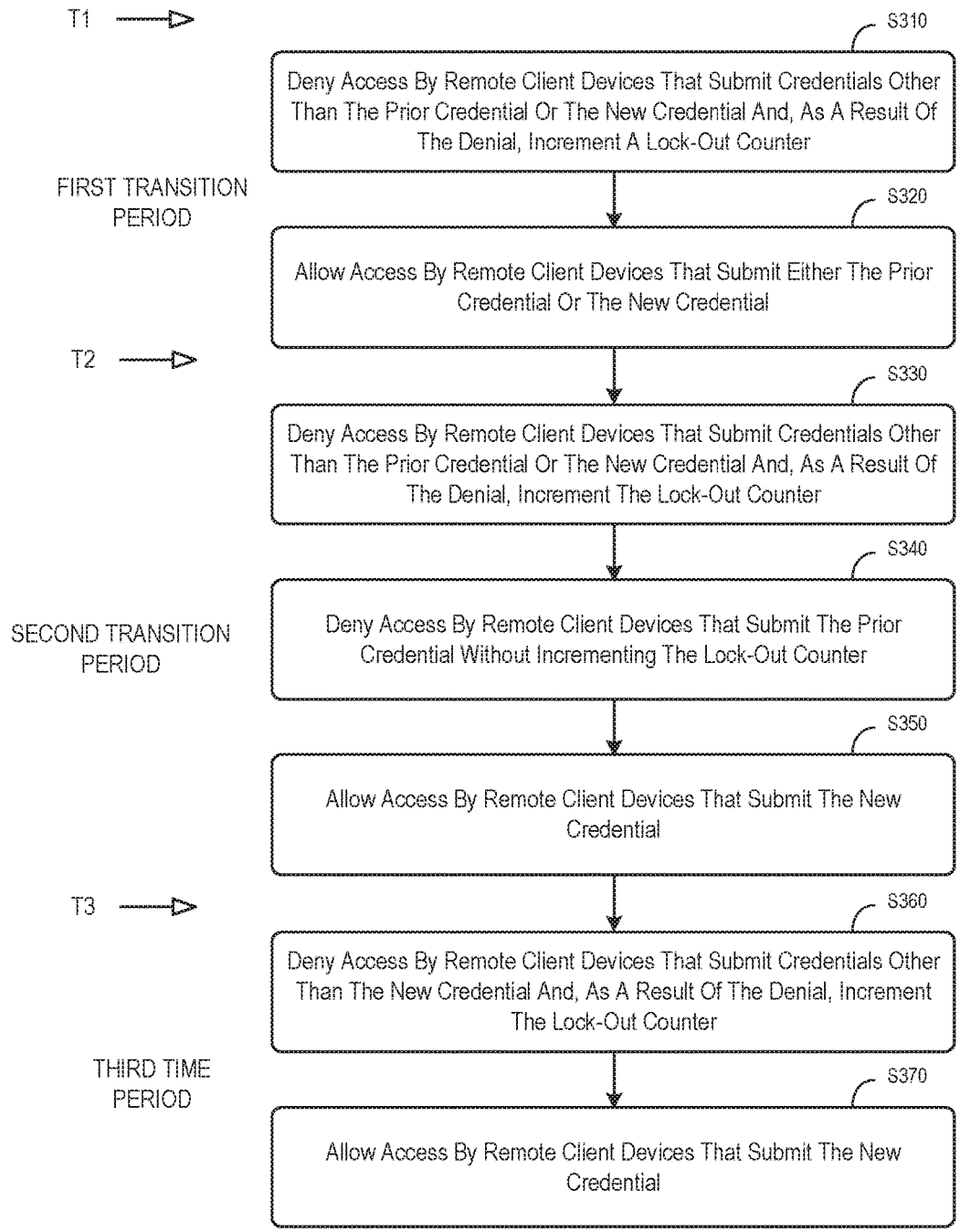
FIG. 3 illustrates credential change management method that might be performed according to some embodiments.

FIG. 3 illustrates a method that might be performed by some or all of the elements of the system 200 described with respect to FIG. 2, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The first two steps (S310, S320) may be performed during a first transitional time period from time T1 to time T2. In particular, at S310 the system may deny access by remote client devices that submit credentials other than the prior credential or the new credential and, as a result of the denial, increment a lock-out counter. At S320, the system may allow access by remote client devices that submit either the prior credential or the new credential. The, consumers who still have the previous password will still be allowed to access the system for a given period of time.

The next three steps (S330, S340, S350) may be performed during a second transitional time period from time T2 to time T3. In particular, at S330 the system may deny access by remote client devices that submit credentials other than the prior credential or the new credential and, as a result of the denial, increment the lock-out counter. At S340, the system may deny access by remote client devices that submit the prior credential without incrementing the lock-out counter. Thus, although consumers with the previous password are not allowed to access the system, at least they are not at risk of having their account inadvertently locked. At S350, the system may allow access by remote client devices that submit the new credential.

The last two steps (S360, S370) may be performed during a third time period after time T3. In particular, at S360 the system may deny access by remote client devices that submit credentials other than the new credential and, as a result of the denial, increment the lock-out counter. At S370, the system may allow access by remote client devices that submit the new credential.

According to some embodiments, T2 may be the same as T1. That is, there would be no first transition period and the system would instead start the process at step S330 by denying access to remote client devices that submit credentials other than the prior credential or the new credential and, as a result of the denial, the lock-out counter is increment. At no point would the system accept both the old and the new credential. In other words, during an initial transition period from a change time (when the password was changed) to completion time (when the transition to the new password is complete), the old password would be blocked without incrementing the lock-out counter. Such an approach might be appropriate, for example, when it is suspected that the old password has been discovered by an unauthorized party.

Figure 4:
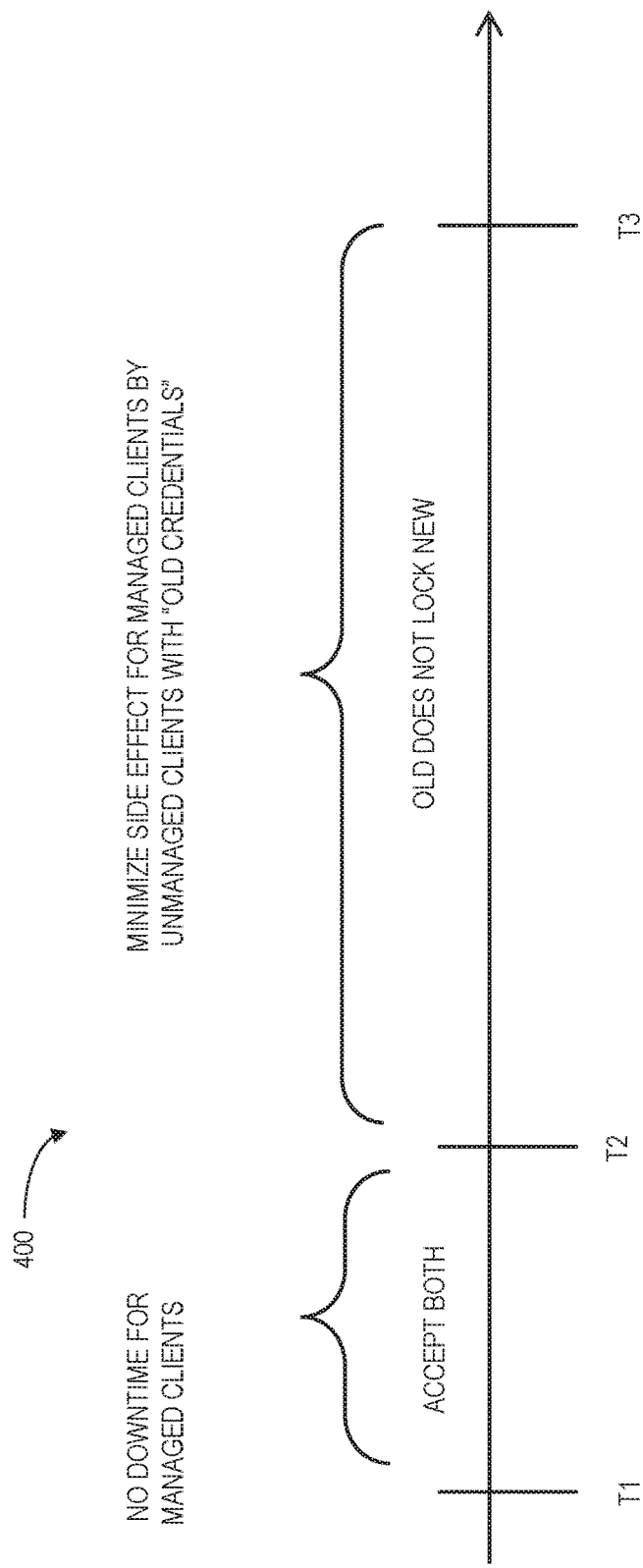
FIG. 4 is a timeline for a phased approach to credential change management in accordance with some embodiments.

FIG. 4 is a timeline 400 for a phased approach to credential change management in accordance with some embodiments. At time T1, the system decides to replace an old password with a new password. That is, prior to time T1 only the old password provided access to the system (and all other credentials increment a failed lock counter). During a first transitional time period from time T1 to time T2, the system will now let either the old or the new password provide access. That is, it is assumed that various clients are being updated with the new password and it is possible that some clients have not yet processed the change.

During a second transitional time period from T2 to T3, only the new password will provide access to the system. Clients who submit the old password will be denied access. During this time period, however, in order to minimize unintended side effects for clients who still have not received and/or processed the new password, the old password will not increment the failed login counter. As a result, clients who submit the old password are not at risk of having their accounts locked. Note that a party who submits a credential that is neither the old password nor the new password will not be allowed to access the system and the failed login counter will be incremented. After time T3, it is assumed that all clients should be aware of the new password. That is, after time T3 only the new password will provide access to the system (and all other credentials will increment the failed lock counter).

Figure 5:
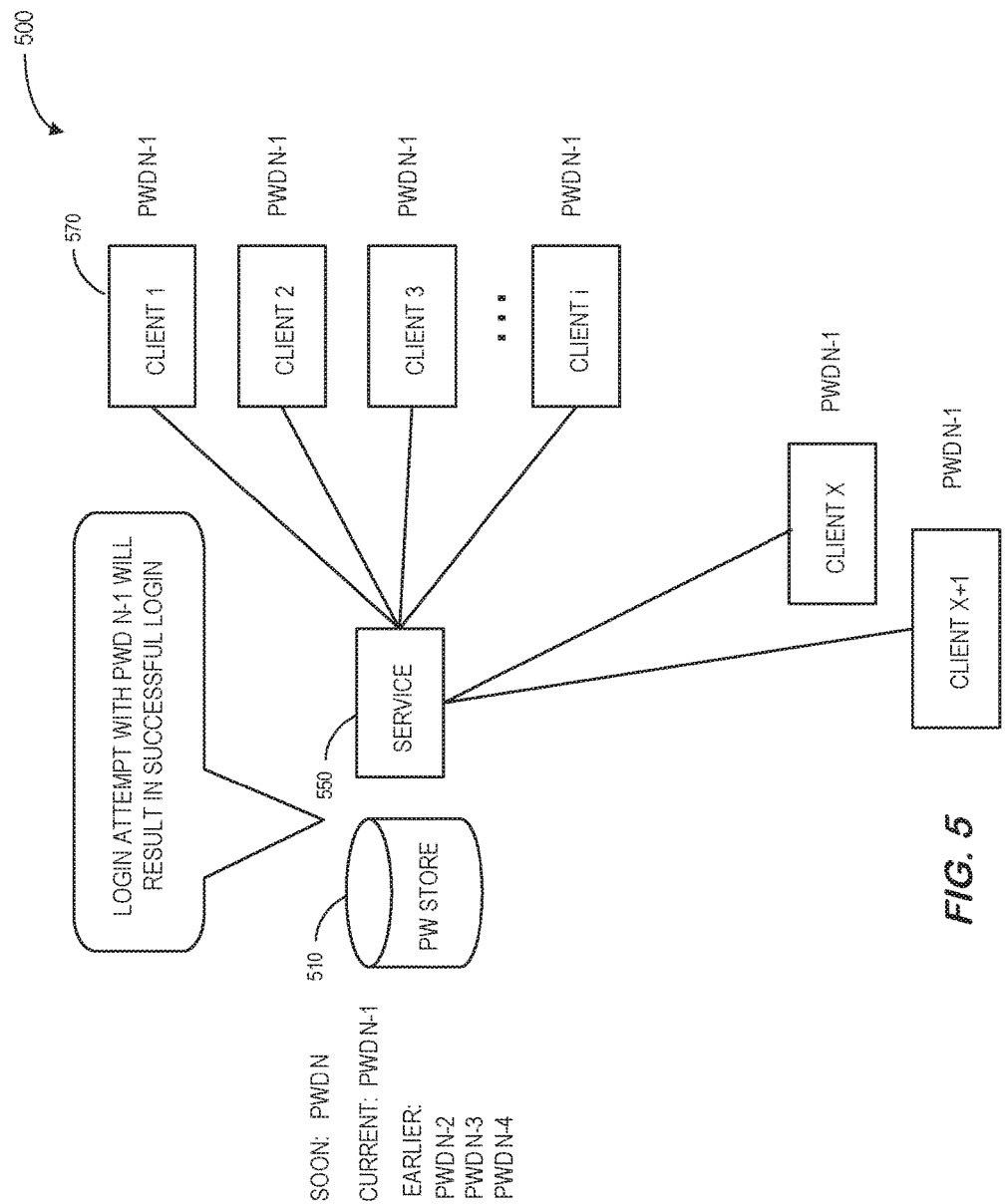
FIG. 5 illustrates a system for credential change management before a first transitional time period according to some embodiments.

FIG. 5 illustrates a system 500 for credential change management before a first transitional time period according to some embodiments. The system 500 includes a service 550, a password store 510 (containing what is about to become the new password "PWD N," the current password "PWD N−1," and older passwords), and a number of clients 570. At this time, every client 570 is still using the current password "PW N−1." Thus, all logins by clients 570 using the current password will be allowed. Of course, any attempted login with a password that is not the current password will not be allowed to access the service 550 (and will increment a failed login counter).

Even if passwords are managed centrally and are provided to the clients 570 automatically, there might not be any way to change the credentials "in one transaction" for the service 550 and every client 570. Thus, there might be a delay between when one client 570 received the new password as compared to another client 570. To provide un-interrupted operation, according to some embodiments both the old and the new credentials may work for a certain (perhaps relatively short) period of time. According to other embodiments, not amount of time is provided during which both the old and new credentials will provide access to the system.

Figure 6:
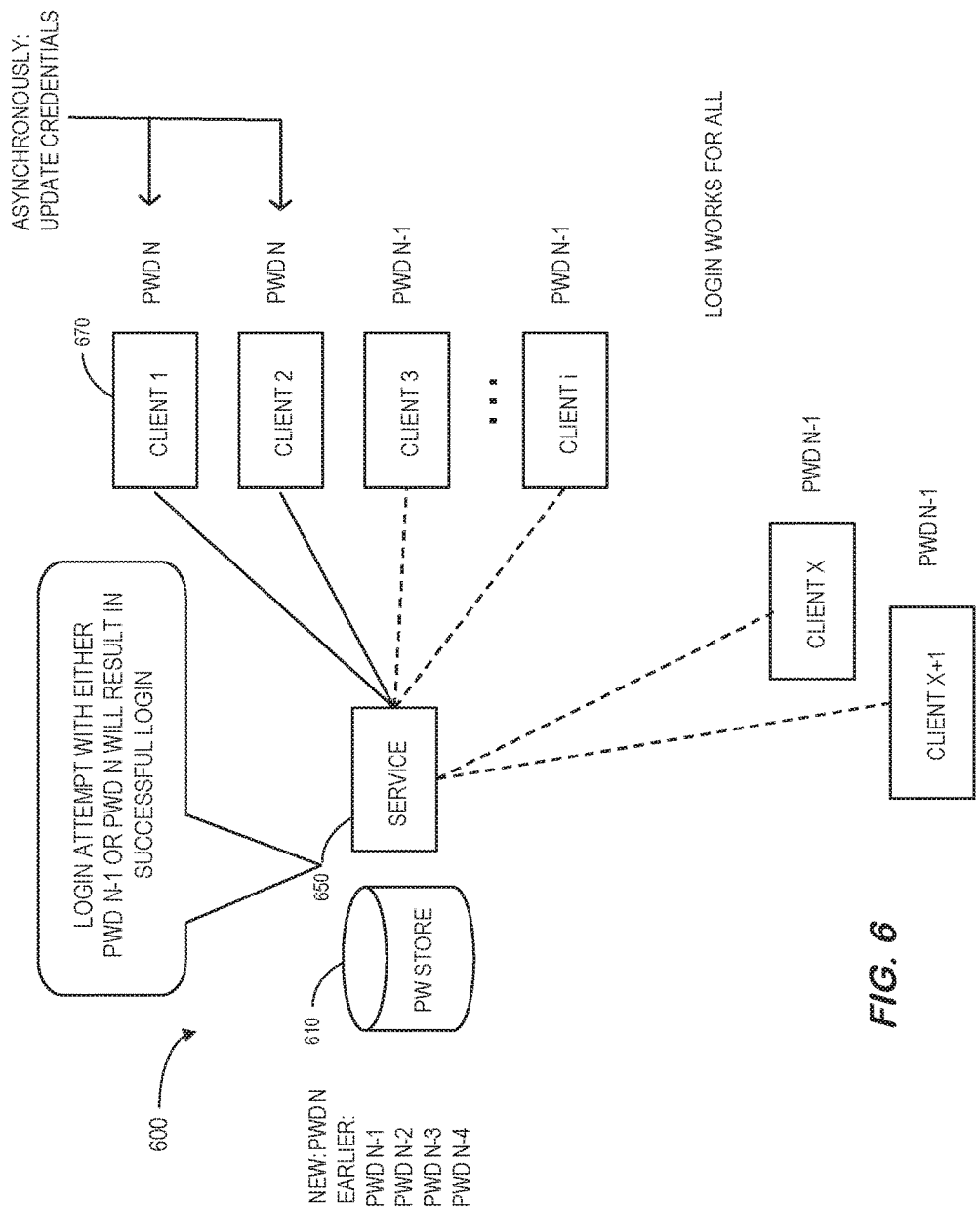
FIG. 6 illustrates a system for credential change management during a first transitional time period in accordance with some embodiments.

For example, an authentication module of the service 550 may be extended to support a phased credential change process. FIG. 6 illustrates a system 600 for credential change management during a first transitional time period in accordance with some embodiments. The system 600 includes a service 650, a password store 610 (containing what is now the new password "PWD N," the prior password "PWD N−1," and older passwords), and a number of clients 670. As illustrated in FIG. 6, some clients 670 (Client 1 and Client 2) have the new password while the other clients 670 still have the old password. During this first transitional time, logins with either the old or the new passwords are allowed. That is, the system 600 assumes that passwords are still being updated (which might be an asynchronous process). Of course, any attempted login with a different password (that is, which is neither the old nor new password) will not be allowed to access the service 650. By way of example only, this first transitional time period might last for five minutes after a new password is created.

Figure 7:
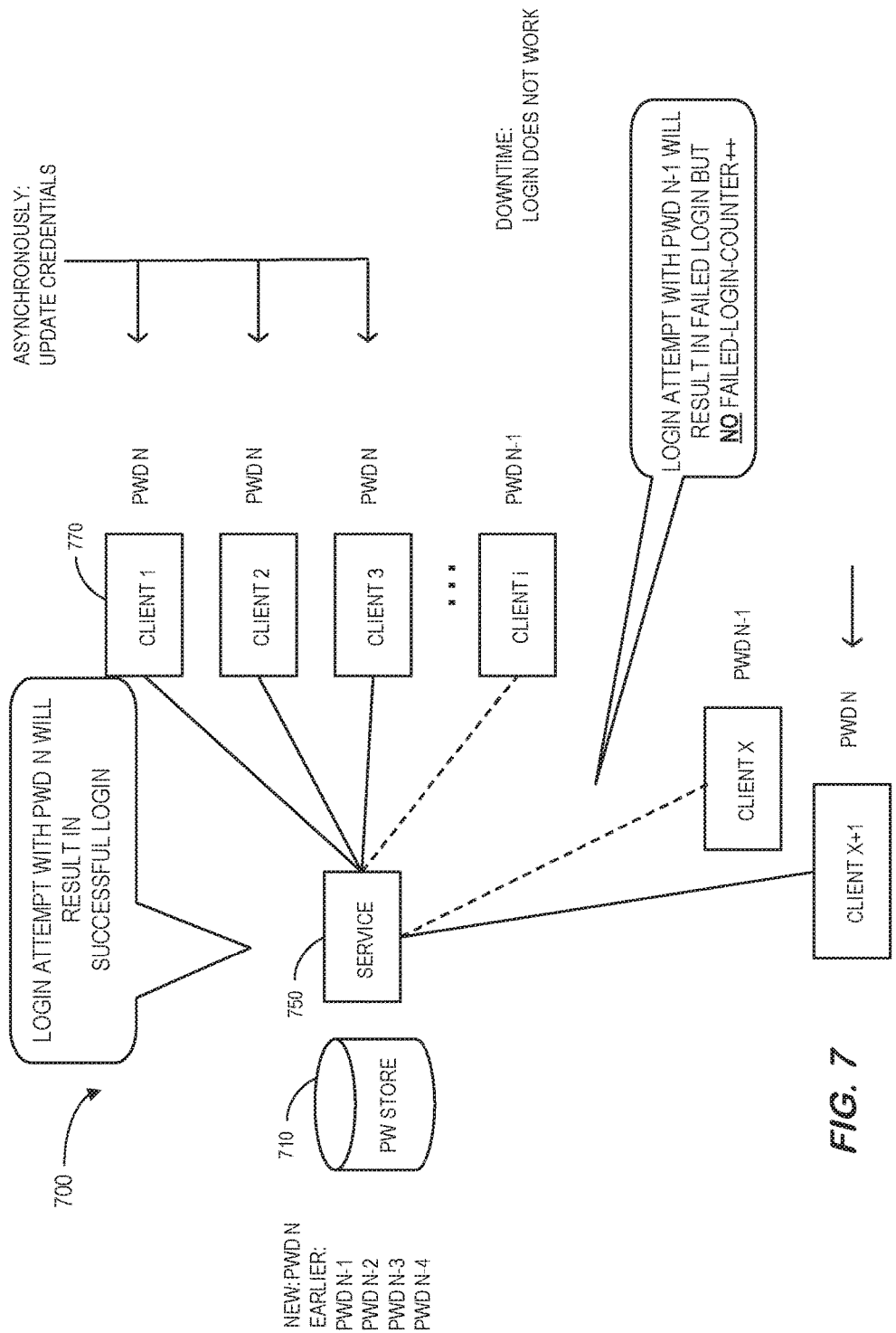
FIG. 7 illustrates a system for credential change management during a second transitional time period according to some embodiments.

Note that the automatic distribution of credentials to clients 670 may take longer than the first transitional time period. In addition, there may be clients 670 who do not receive the credentials automatically (e.g., need to receive the new password manually which might be a slower process. FIG. 7 illustrates a system 700 for credential change management during a second transitional time period according to some embodiments. The system 700 includes a service 750, a password store 710 (containing what is now the new password "PWD N," the prior password "PWD N−1," and older passwords), and a number of clients 770. As illustrated in FIG. 7, some clients 770 (Client 1, Client 2, Client 3, and Client X+1) have the new password while the other clients 770 still have the old password. During this second transitional time period, logins with only the new password are allowed. Thus, logins by Client i and Client X (with the old password) will be prevented. However, the system 700 understands that some password updates might still be in process. As a result, the failed login counter is not incremented (and those clients 770 do not need to worry about having their accounts locked or deactivated). Of course, any attempted login with a different password (that is, which is neither the old nor new password) will not be allowed to access the service 750 and will result in the failed login counter being incremented. By way of example only, this second transitional time period might last for thirty minutes after the first transitional time period ended.

According to some embodiments, the system 700 might, during the second transitional time period, send as a reply to a login with the old credential an error message different from "invalid login" (e.g., something like a reminder that "you need to update your credentials"). According to some embodiments, a login with the old password during the second transitional time period might be reported to a central monitoring process or the consumer (if a human) so he or she can get the new credential. Such a message might also prevent the consumer from retrying authentication with its old password (as it now realizes that the old password needs to be updated).

Figure 8:
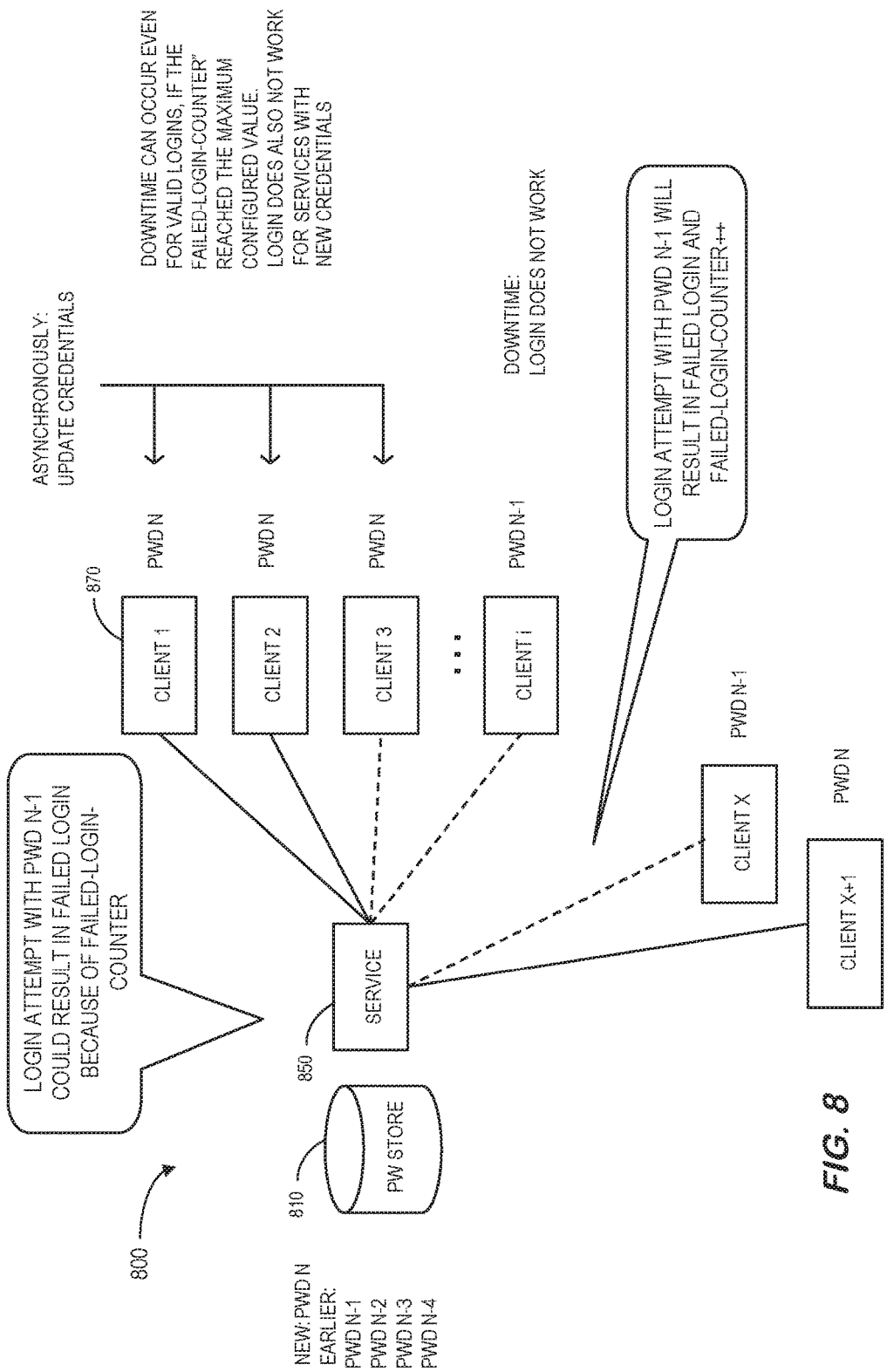
FIG. 8 illustrates a system for credential change management during a third time period in accordance with some embodiments.

After the second transitional time period, the transition is considered complete and the system will accept only the new credential and will increase the invalid-login-counter (even if the old credentials are supplied). FIG. 8 illustrates a system 800 for credential change management during this third time period in accordance with some embodiments. The system 800 includes a service 850, a password store 810 (containing what is now the new password "PWD N," the prior password "PWD N−1," and older passwords), and a number of clients 870. As illustrated in FIG. 8, some clients 870 (Client 1, Client 2, Client 3, and Client X+1) have the new password while the other clients 870 still have the old password. During this third time period, logins with only the new password are allowed. Thus, logins by Client i and Client X (with the old password) will be prevented. In addition, any attempted login with a different password (that is, including the old password or any other credential) will result in the failed login counter being incremented. The third time period may last until the next time the system 800 needs to change the password.

According to some embodiments, the first transitional time period has a duration of zero. That is, T2 equals T1 and the system immediately requires the new password (although there is still a grace period during which the failed login counter is not incremented when the old password is used). Such an approach might be appropriate, for example, when it is suspected that an unauthorized user has access to the old password. Similarly, there might be a situation where an audit trail is needed (e.g., indicating which consumer logged in based on his or her credential use) in which case it might not be desirable to have a period during which both the old and new credentials are valid.

According to some embodiments, the change from the second transitional time period to the third time period might be dynamically adjusted (e.g., the value of T3 might be modified). For example, the third time period might be implemented earlier if not invalid logins are received with the old credential for a predetermined period of time (e.g., ten minutes). As another example, the third time period might be implemented as soon as the system determines that all clients have successfully logged in with the new credentials (e.g., as identified by IP address).

Figure 9:
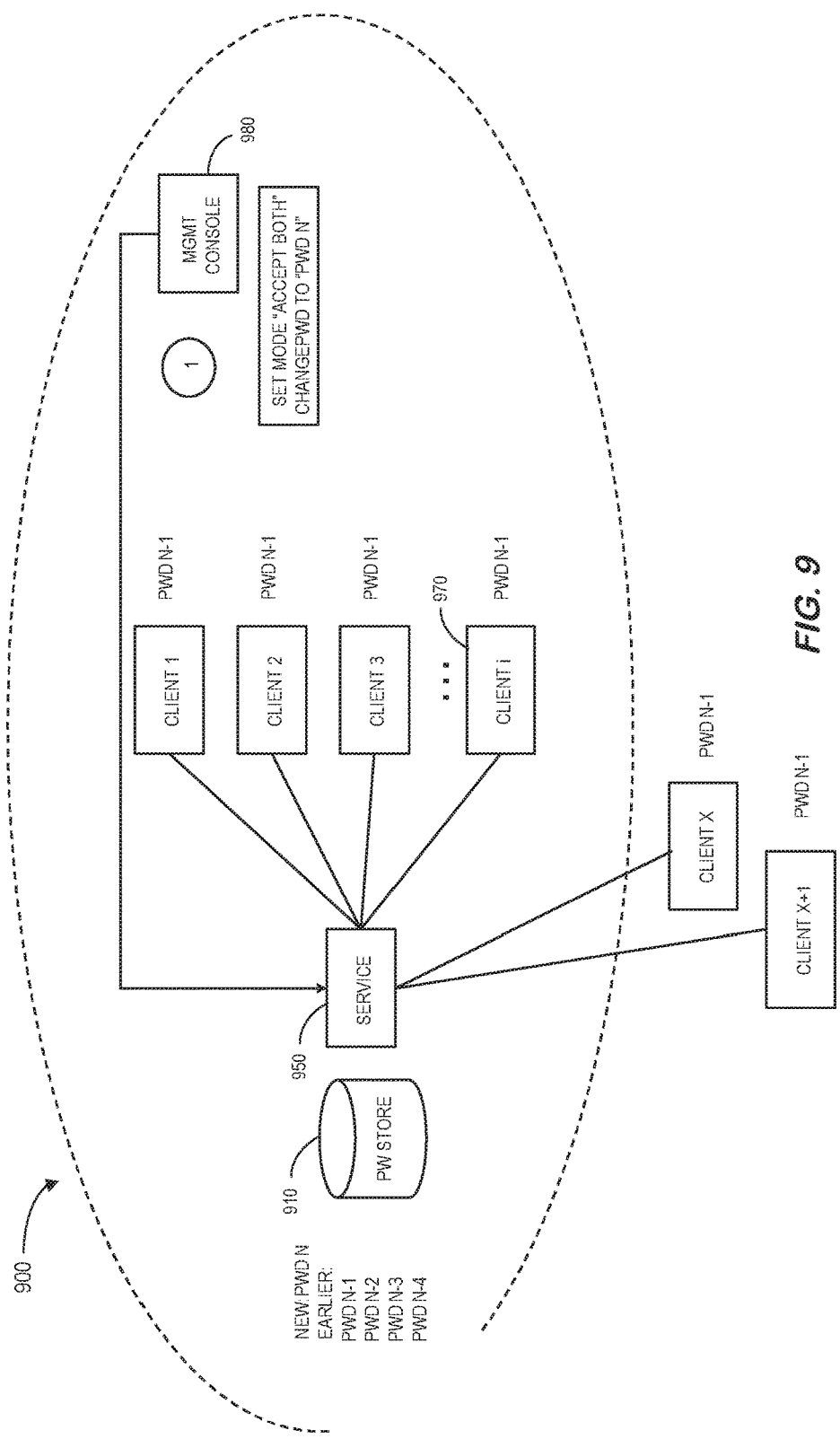
FIG. 9 illustrates a system including a management console for credential change management before a first transitional time period according to some embodiments.

According to some embodiments, a management console may facilitate the update of security credentials. For example, the availability of a service might be increased if the passwords are managed actively by a central console. Such a console might, for example: configure a service to set the credential policy (e.g., including time periods to "accept both," "old does not lock new," and "standard"); change the credentials of the service; maintain a list of "managed consumers" of the service; and/or push credentials to the consumers. FIG. 9 illustrates a system 900 including a management console 980 for credential change management before a first transitional time period according to some embodiments. The system 900 includes a service 950, a password store 910 (containing what is about to become the new password "PWD N," the current password "PWD N−1," and older passwords), the management console 980, and a number of clients 970. At this time, every client 970 is still using the current password "PW N−1." Thus, all logins by clients 970 using the current password will be allowed. Of course, any attempted login with a password that is not the current password will not be allowed to access the service 950 (and will increment a failed login counter).

Figure 10:
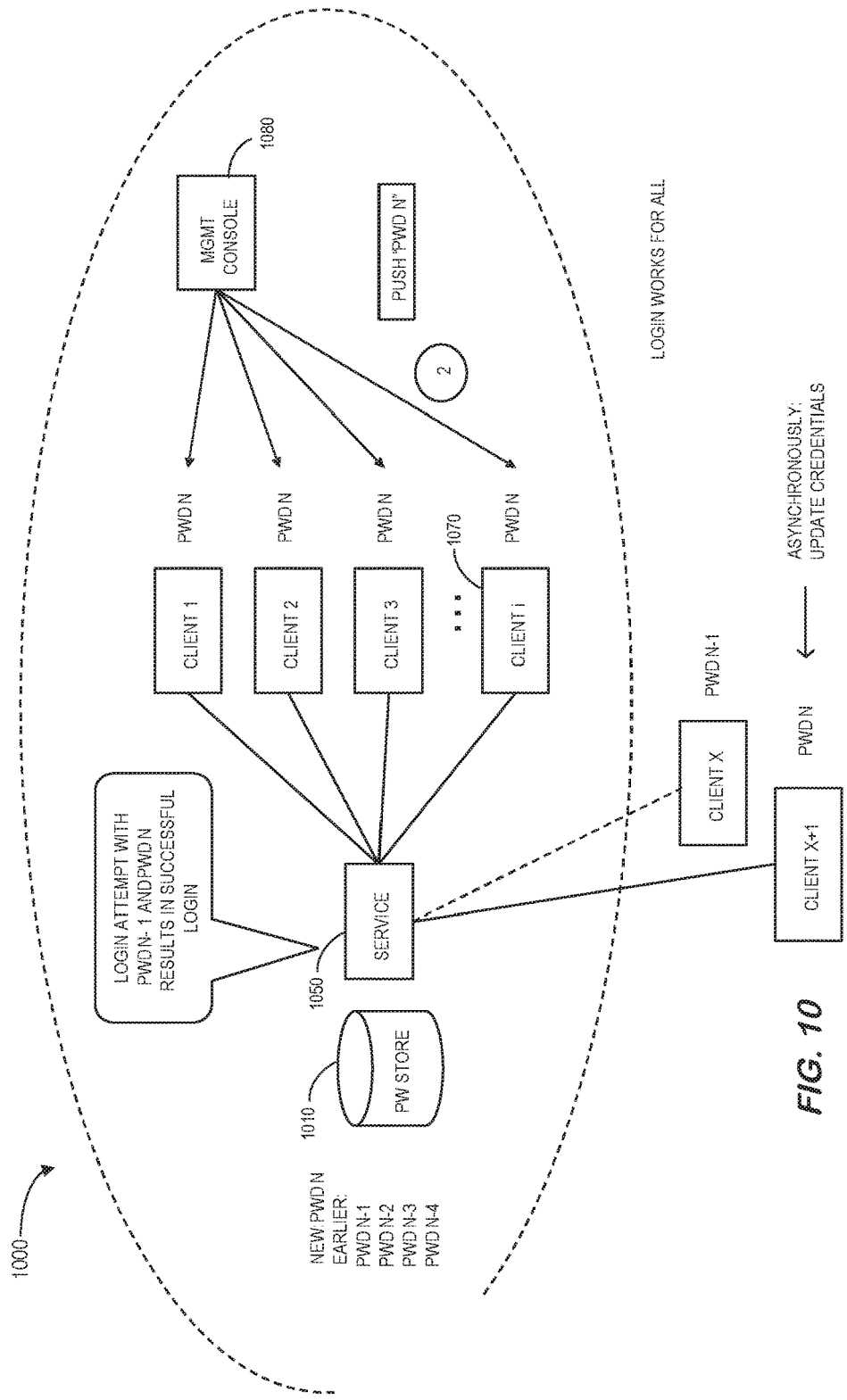
FIG. 10 illustrates a system including a management console for credential change management during a first transitional time period in accordance with some embodiments.

Even if passwords are managed centrally and are provided to the clients 970 automatically, there might not be any way to change the credentials "in one transaction" for the service 950 and every client 970. Thus, there might be a delay between when one client 970 received the new password as compared to another client 970. To provide un-interrupted operation, according to some embodiments the management console 980 may arrange at (1) for both the old and the new credentials to work for a certain (perhaps relatively short) period of time. FIG. 10 illustrates a system 1000 for credential change management during such a first transitional time period in accordance with some embodiments. The system 1000 includes a service 1050, a password store 1010 (containing what is now the new password "PWD N," the prior password "PWD N−1," and older passwords), a management console 1080, and a number of clients 1070. As illustrated in FIG. 10, the management console 1080 has updated clients 1070 it controls (Client 1 through Client i) to the new password. Other clients 1070 will receive asynchronously updated credentials. During this first transitional time, logins with either the old or the new passwords are allowed. That is, the system 1000 assumes that passwords are still being updated (which might be an asynchronous process). Of course, any attempted login with a different password (that is, which is neither the old nor new password) will not be allowed to access the service 1050. By way of example only, this first transitional time period might last for five minutes after a new password is created.

Figure 11:
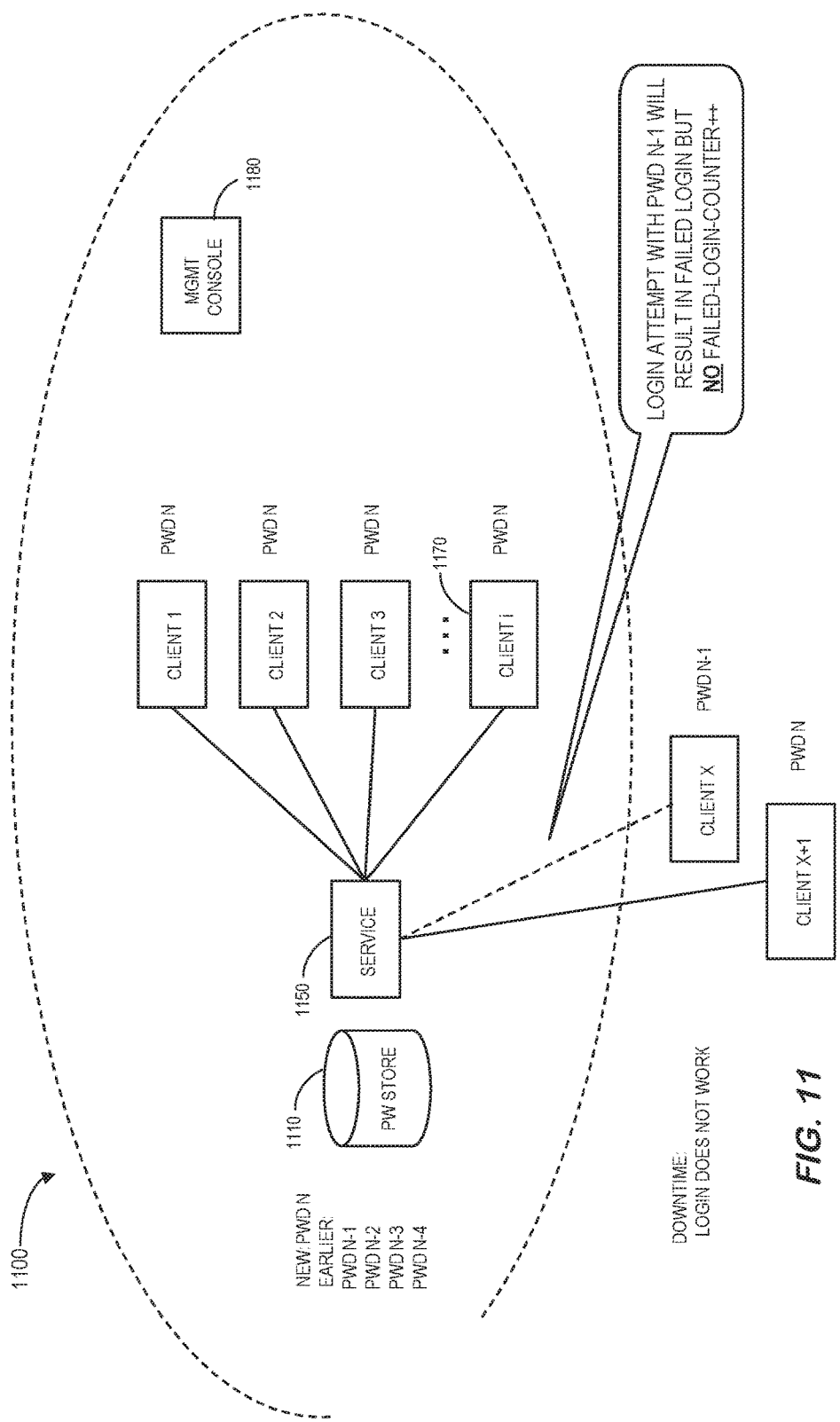
FIG. 11 illustrates a system including a management console for credential change management during a second transitional time period according to some embodiments.

Note that the automatic distribution of credentials to clients 1070 may take longer than the first transitional time period. FIG. 11 illustrates a system 1100 for credential change management during a second transitional time period according to some embodiments. The system 1100 includes a service 1150, a password store 1110 (containing what is now the new password "PWD N," the prior password "PWD N−1," and older passwords), a management console 1180, and a number of clients 1170. As illustrated in FIG. 11, the management console 1080 at (2) has pushed the new password such that some clients 1170 (Client 1, Client 2, Client 3, Client i, and Client X+1) have the new password while one client 1170 (Client X) still has the old password. During this second transitional time period, logins with only the new password are allowed by the management console 1180. Thus, logins by Client X (with the old password) will be prevented. However, the management console 1180 understands that some password updates might still be in process. As a result, the failed login counter is not incremented (and those clients 1170 do not need to worry about having their accounts locked or deactivated). Of course, any attempted login with a different password (that is, which is neither the old nor new password) will not be allowed to access the service 1150 and will result in the failed login counter being incremented.

Figure 12:
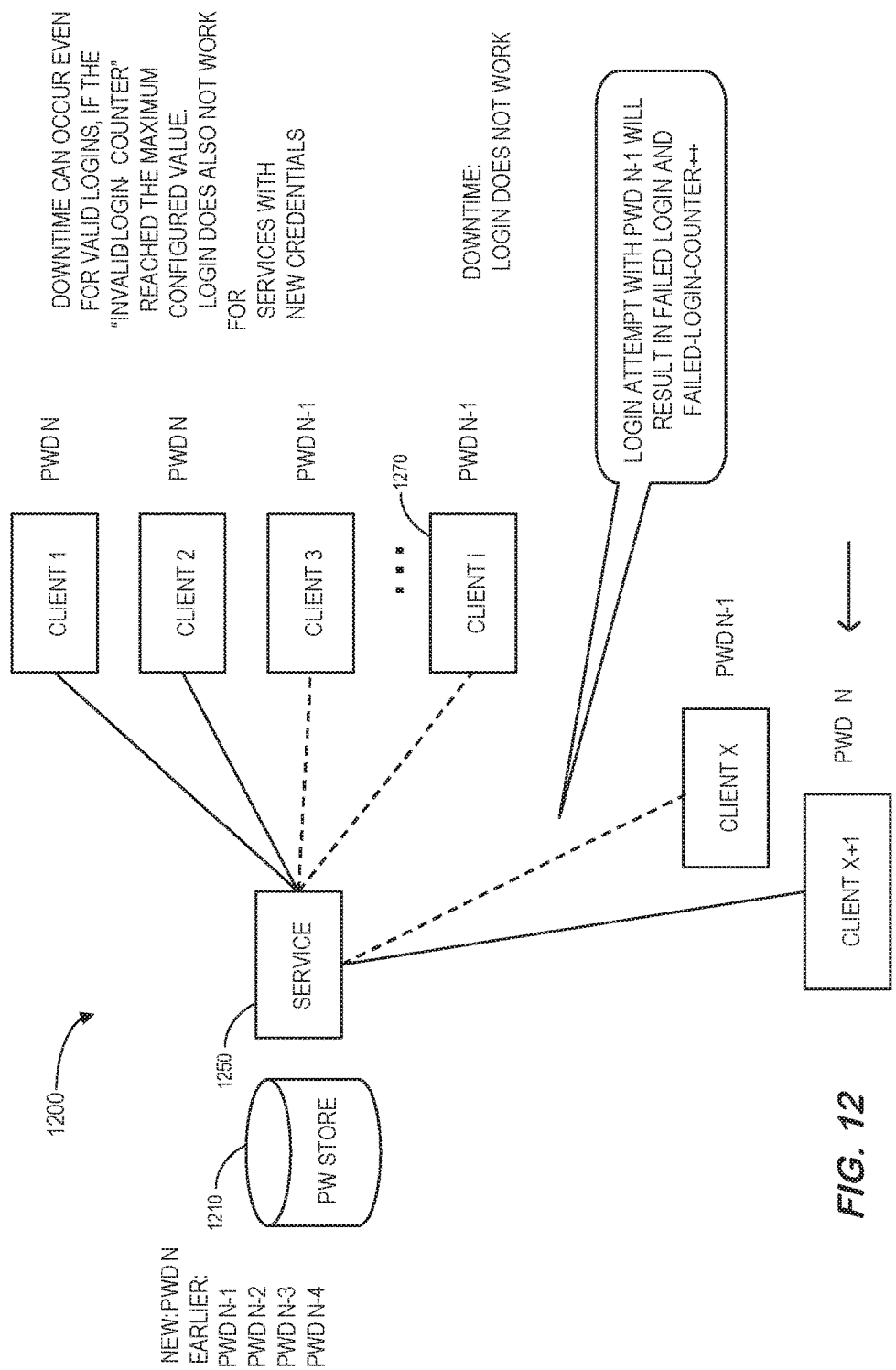
FIG. 12 illustrates a system including a management console for credential change management during a third time period in accordance with some embodiments.

After the second transitional time period, the transition is considered complete by the management console and the system will accept only the new credential and will increase the invalid-login-counter (even if the old credentials are supplied). FIG. 12 illustrates a system 1200 for credential change management during this third time period in accordance with some embodiments. The system 1200 includes a service 1250, a password store 1210 (containing what is now the new password "PWD N," the prior password "PWD N−1," and older passwords), and a number of clients 1270. As illustrated in FIG. 12, some clients 1270 (Client 1, Client 2, and Client X+1) have the new password while the other clients 1270 still have the old password. During this third time period, logins with only the new password are allowed. Thus, logins by Client 3, Client i, and Client X (with the old password) will be prevented. In addition, any attempted login with a different password (that is, including the old password or any other credential) will result in the failed login counter being incremented. The third time period may last until the next time the system 1200 needs to change the password.

According to some embodiments, a management console may monitor a service and record information such as: the IP of the client (or other identification criteria) that attempts to login; a user name; if the provided credentials matched the new password; if the provided credentials matched the previously valid password; and the date and time. Such a management console might provide statistics. For example, "during a certain period of time how many login attempts with the 'previously valid' credentials occurred?" The management console might also provide an alert function by identifying callers using the old credentials. For example, the management console might automatically transmit an alert message to an administrator if a relatively large number of clients are still using old credentials. Such an alert message might include, for example, the IP addresses of the clients (or other identification criteria) to help the administration identify and/or correct the issue.

Figure 13:
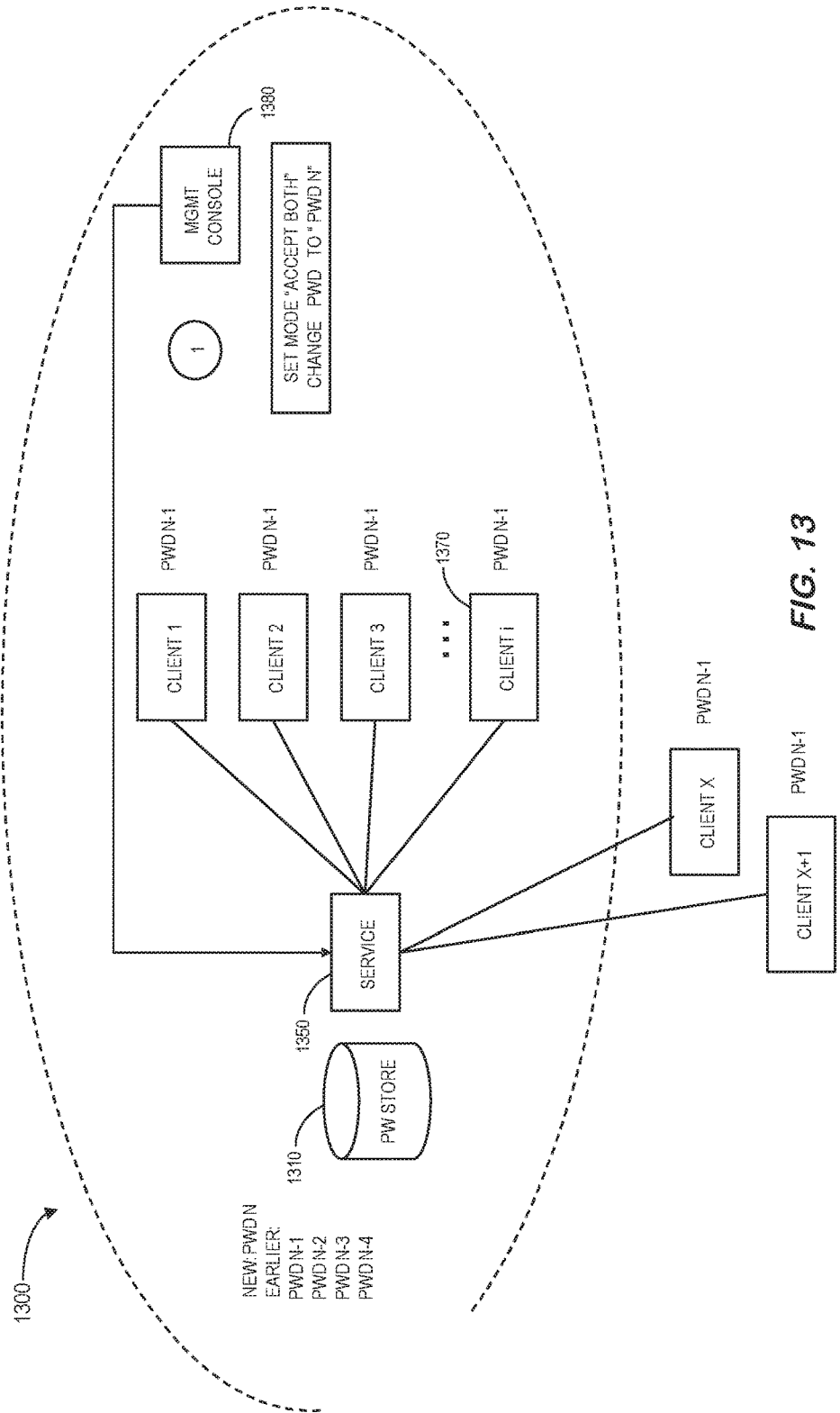
FIG. 13 illustrates a system including a management console before a first transitional time period according to some embodiments.

FIG. 13 illustrates a system 1300 including a management console 1380 for credential change management before a first transitional time period according to some embodiments. The system 1300 includes a service 1350, a password store 1310 (containing what is about to become the new password "PWD N," the current password "PWD N−1," and older passwords), the management console 1380, and a number of clients 1370. At this time, every client 1370 is still using the current password "PW N−1." Thus, all logins by clients 1370 using the current password will be allowed. Of course, any attempted login with a password that is not the current password will not be allowed to access the service 1350 (and will increment a failed login counter).

Figure 14:
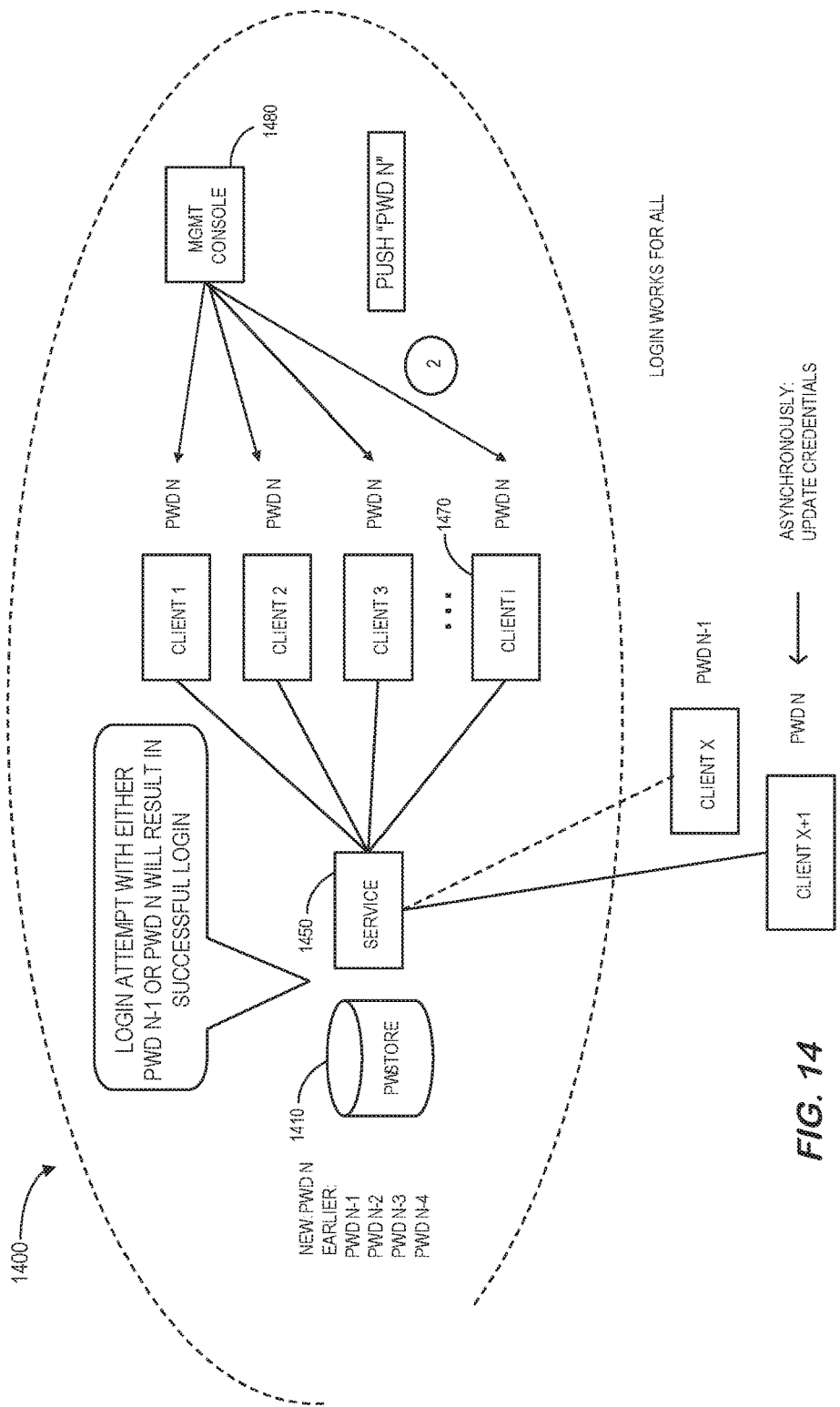
FIG. 14 illustrates a system including a management console during a first transitional time period in accordance with some embodiments.

To provide un-interrupted operation, according to some embodiments the management console 1380 may arrange at (1) for both the old and the new credentials to work for a certain (perhaps relatively short) period of time. FIG. 14 illustrates a system 1400 for credential change management during such a first transitional time period in accordance with some embodiments. The system 1400 includes a service 1450, a password store 1410 (containing what is now the new password "PWD N," the prior password "PWD N−1," and older passwords), a management console 1480, and a number of clients 1470. As illustrated in FIG. 14, at (2) the management console 1480 has updated clients 1470 it controls (Client 1 through Client i) to the new password. Other clients 1470 will received asynchronously updated credentials. During this first transitional time, logins with either the old or the new passwords are allowed. That is, the system 1400 assumes that passwords are still being updated (which might be an asynchronous process). Of course, any attempted login with a different password (that is, which is neither the old nor new password) will not be allowed to access the service 1450. By way of example only, this first transitional time period might last for five minutes after a new password is created.

Figure 15:
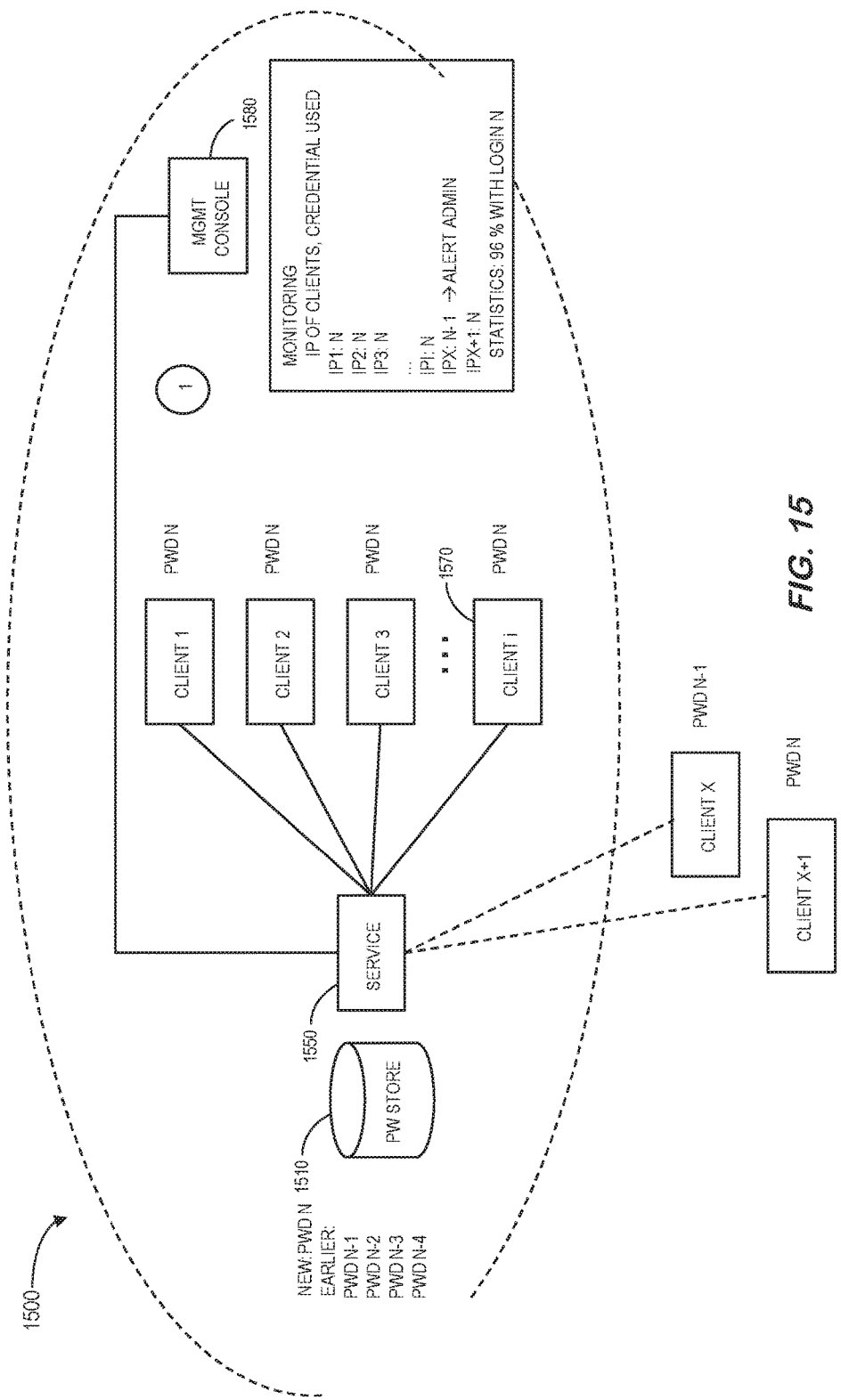
FIGS. 15 and 16 illustrate a system including a management console during a second transitional time period according to some embodiments.

Note that the automatic distribution of credentials to clients 1470 may take longer than the first transitional time period. FIG. 15 illustrates a system 1500 for credential change management during a second transitional time period according to some embodiments. The system 1500 includes a service 1550, a password store 1510 (containing what is now the new password "PWD N," the prior password "PWD N−1," and older passwords), a management console 1580, and a number of clients 1570. As illustrated in FIG. 15, some clients 1570 (Client 1, Client 2, Client 3, Client i, and Client X+1) have the new password while the one client 1570 (Client X) still has the old password. During this second transitional time period, logins with only the new password are allowed by the management console 1580. Thus, logins by Client X (with the old password) will be prevented. According to this embodiment, at (1) the management console 1580 tracks which clients 1570 are using which credentials via IP monitoring. Moreover, the management console 1580 may generate alerts (e.g., to an administrator when Client X supplies the prior credential. According to some embodiments, the management console 1580 may also generate statistics associated with password usage.

Figure 16:
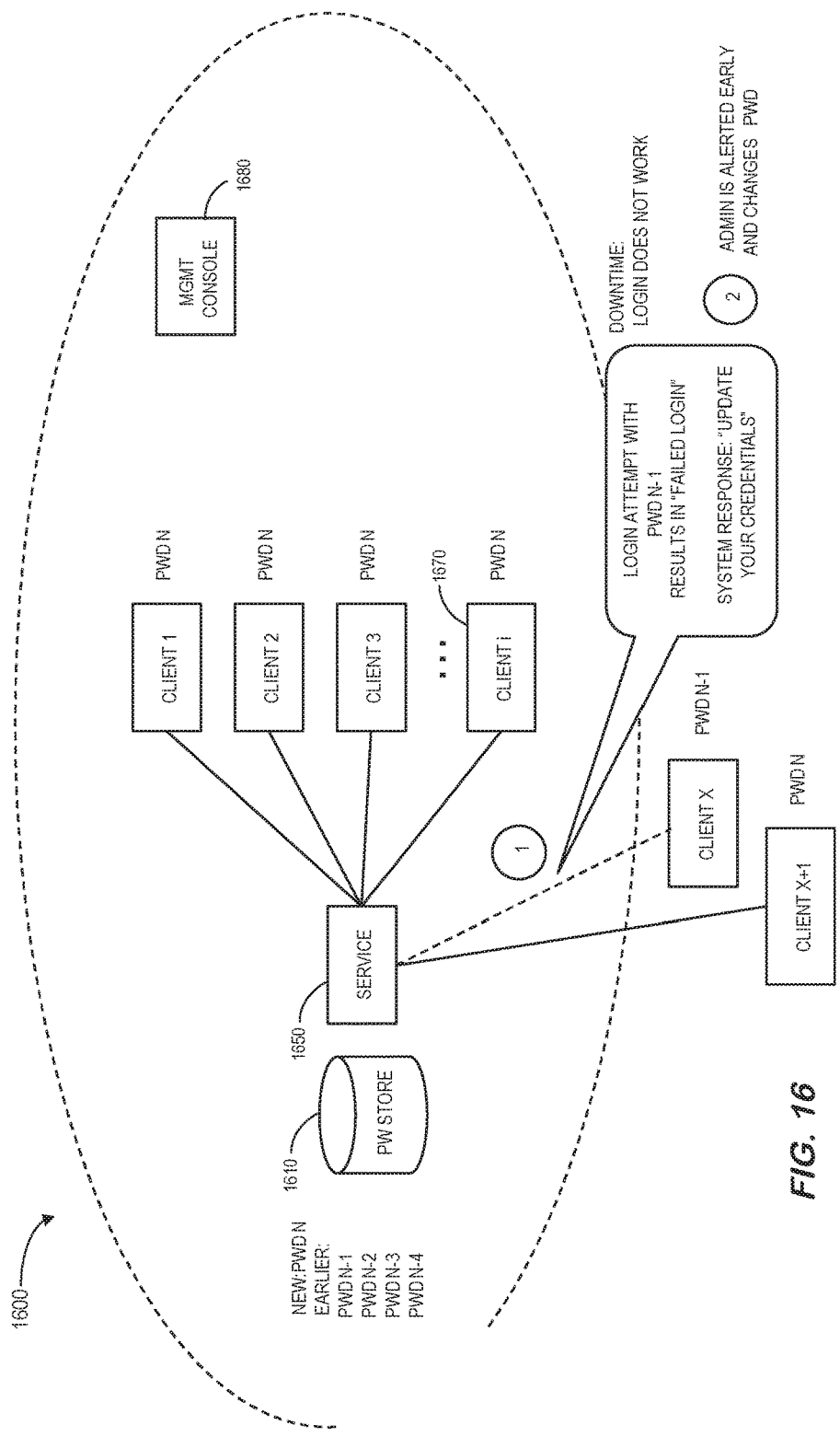

In this way, the management console 1580 may reduce system down time and/or the duration of the second transitional time period. For example, FIG. 16 illustrates a system 1600 for credential change management during the second transitional time period according to some embodiments. The system 1600 includes a service 1650, a password store 1610 (containing what is now the new password "PWD N," the prior password "PWD N−1," and older passwords), a management console 1680, and a number of clients 1670. As illustrated in FIG. 16, at (1) client X attempts to login to service 1650 using the old password. As a result, at (2) the management console 1680 generates a failed login and reminds the client 1670 that he or she needs to "update your credentials." Moreover, the management console 1680 also generates an alert to an administrator.

Figure 17:
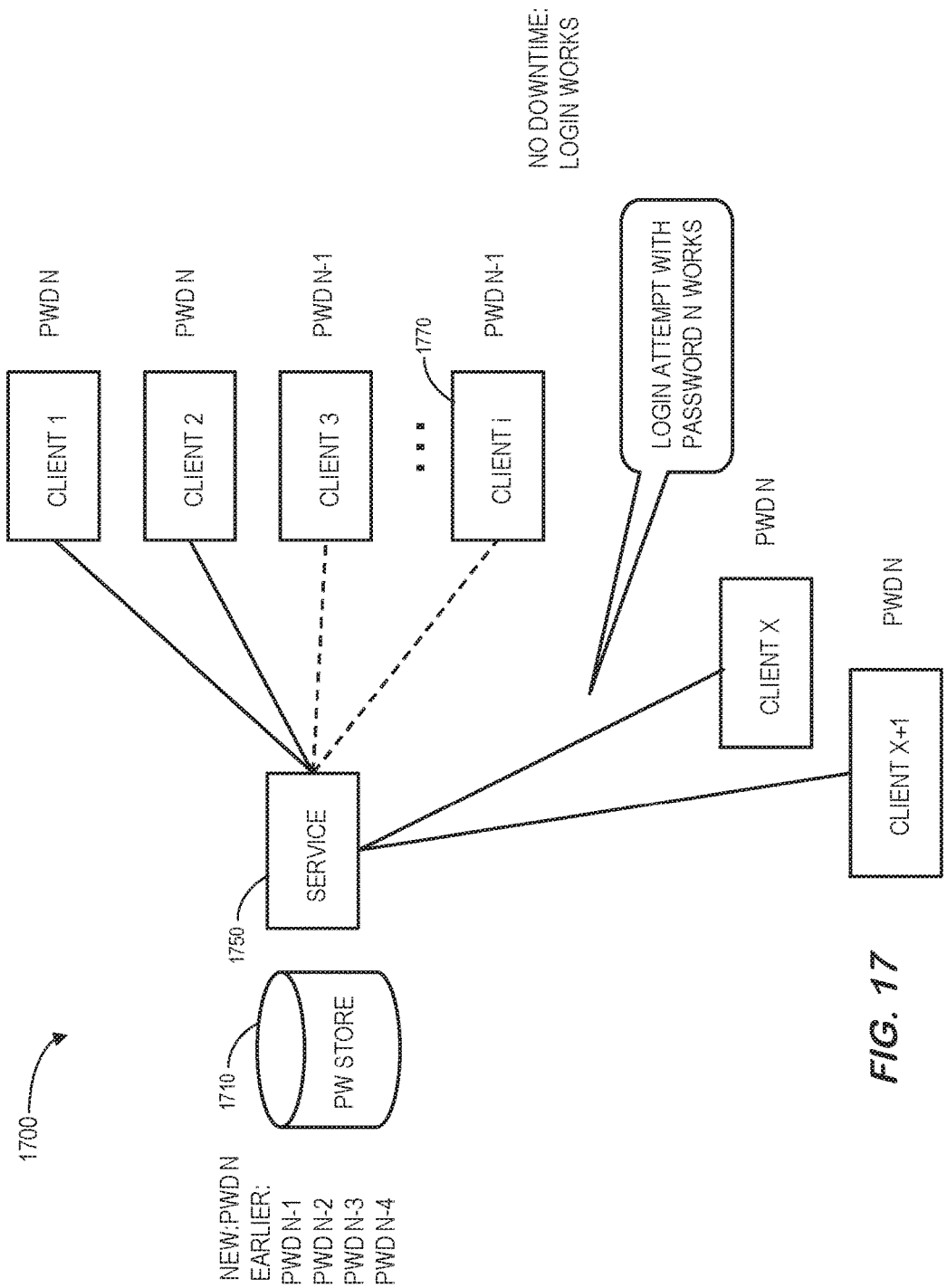
FIG. 17 illustrates a system including a management console during a third time period in accordance with some embodiments.

After the second transitional time period, the transition is considered complete by the management console and the system will accept only the new credential and will increase the invalid-login-counter (even if the old credentials are supplied). FIG. 17 illustrates a system 1700 for credential change management during this third time period in accordance with some embodiments. The system 1700 includes a service 1750, a password store 1710 (containing what is now the new password "PWD N," the prior password "PWD N−1," and older passwords), and a number of clients 1770. As illustrated in FIG. 17, some clients 1770 (Client 1, Client 2, Client X, and Client X+1) have the new password while the other clients 1770 (Client 3 and Client i) still have the old password. During this third time period, logins with only the new password are allowed. Thus, logins by Client 3 and Client i (with the old password) will be prevented. In addition, any attempted login with a different password (that is, including the old password or any other credential) will result in the failed login counter being incremented. The third time period may last until the next time the system 1700 needs to change the password.

According to some embodiments, consumers who login using any of the prior passwords in the password store 1710 (or some subset of those passwords) may receive a hint as opposed to a bare "invalid login" message. For example, a consumer providing any of the last five valid passwords might be given a hint or a reminder to update credentials while an unauthorized login attempt (e.g., using a credential that was never a valid credential) would still receive only an "invalid login" message.

Figure 18:
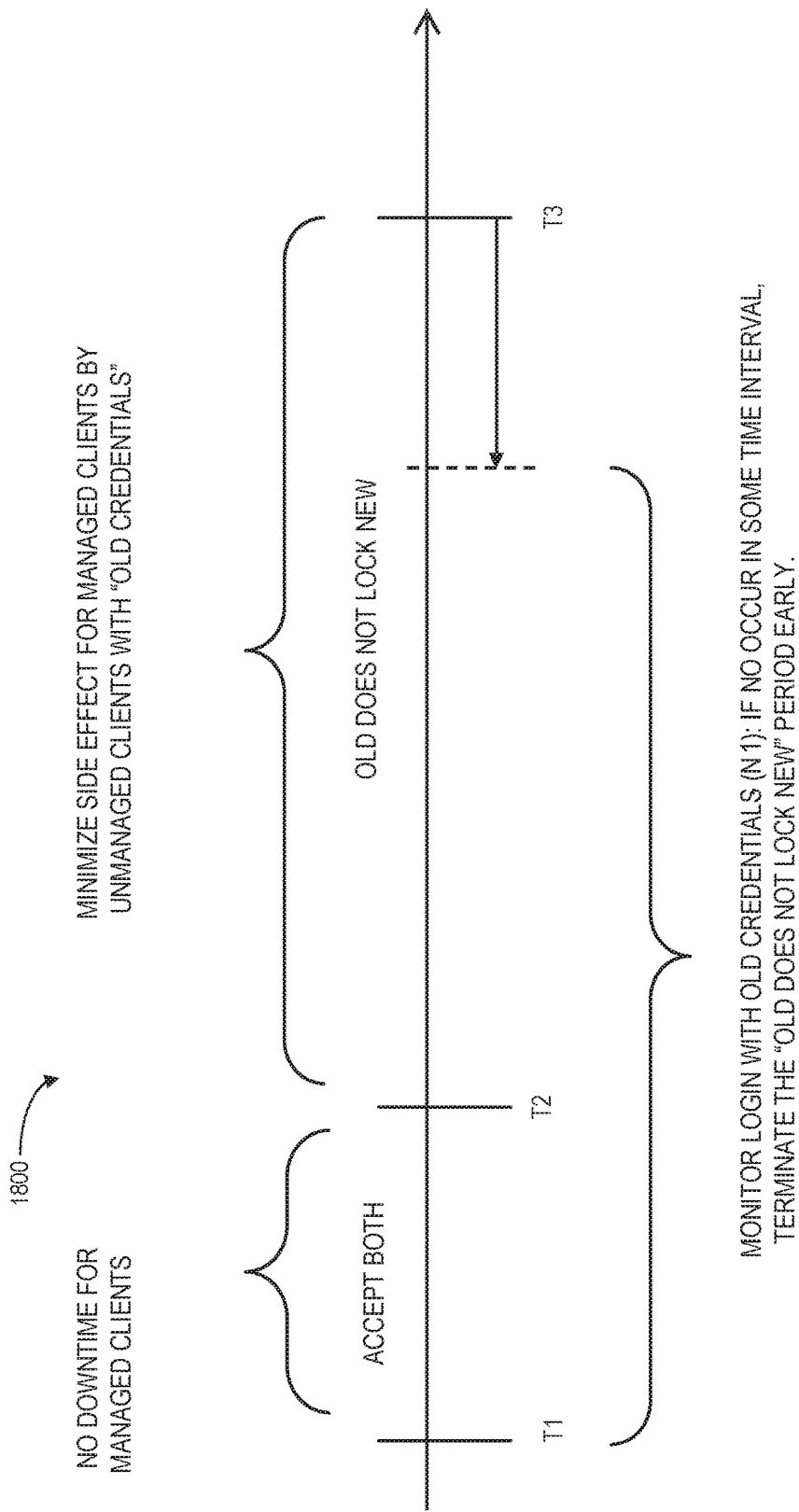
FIG. 18 is a timeline for credential change management with a dynamically adjustable third time period in accordance with some embodiments.

FIG. 18 is a timeline 1800 for credential change management with a dynamically adjustable third time period in accordance with some embodiments. At time T1, the system decides to replace an old password with a new password. That is, prior to time T1 only the old password provided access to the system (and all other credentials increment a failed lock counter). During a first transitional time period from time T1 to time T2, the system will now let either the old or the new password provide access. That is, it is assumed that various clients are being updated with the new password and it is possible that some clients have not yet processed the change.

During a second transitional time period from T2 to T3, only the new password will provide access to the system. Clients who submit the old password will be denied access. During this time period, however, in order to minimize unintended side effects for clients who still have not received and/or processed the new password, the old password will not increment the failed login counter. As a result, clients who submit the old password are not at risk of having their accounts locked. Note that a party who submits a credential that is neither the old password nor the new password will not be allowed to access the system and the failed login counter will be incremented. After time T3, it is assumed that all clients should be aware of the new password. That is, after time T3 only the new password will provide access to the system (and all other credentials will increment the failed lock counter). Note that it may be desired to dynamically adjust the value of T3 to reduce the duration of the second transitional time period and perhaps enhance security. For example, the value of T3 might be reduced when no old passwords have been submitted for some predetermined time interval.

Figure 19:
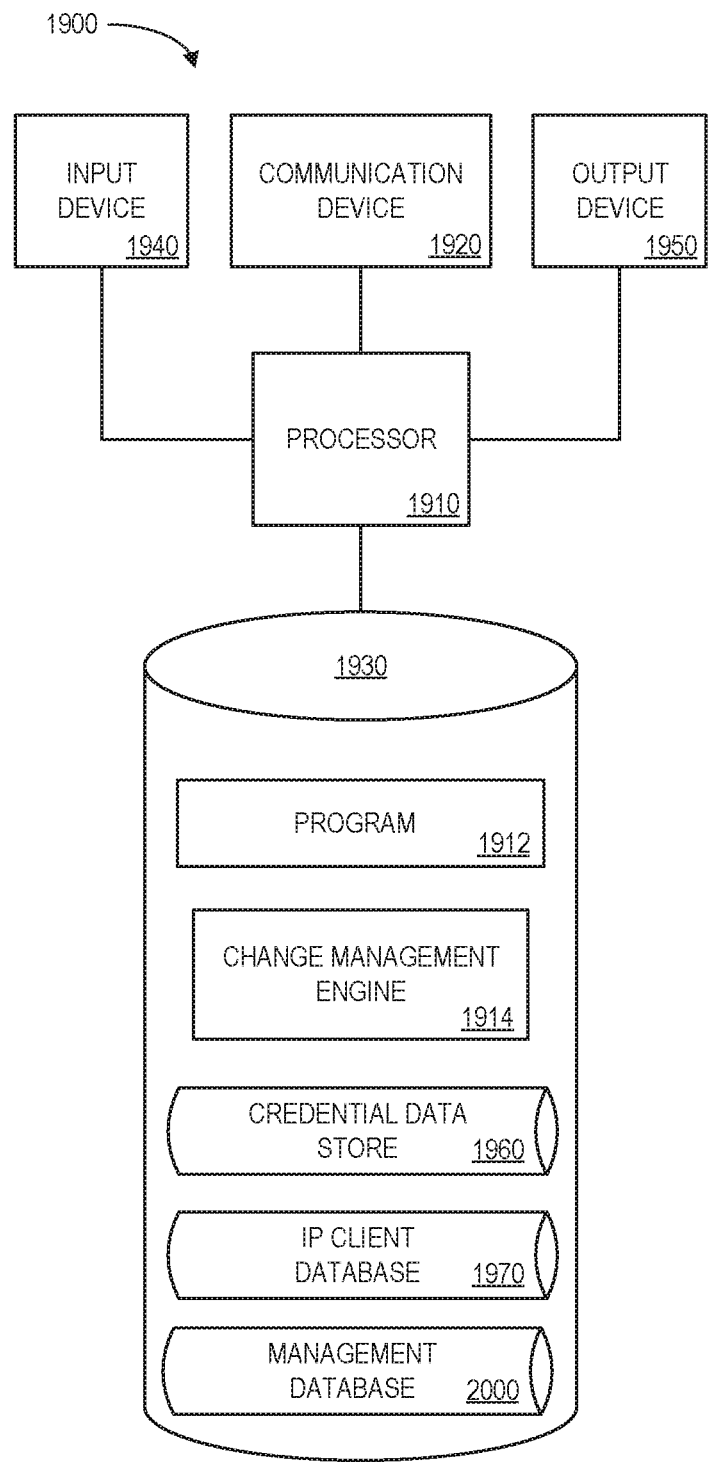
FIG. 19 illustrates a credential change management platform in accordance with some embodiments.

The embodiments described herein may be implemented using any number of different hardware configurations. For example, FIG. 19 is block diagram of a credential change management platform 1900 that may be, for example, associated with the system 200 of FIG. 2. The credential change management platform 1900 comprises a processor 1910, such as one or more commercially available Central Processing Units ("CPUs") in the form of one-chip microprocessors, coupled to a communication device 1920 configured to communicate via a communication network (not shown in FIG. 19). The communication device 1920 may be used to communicate, for example, with one or more remote inspection robots, client devices, etc. The credential change management platform 1900 further includes an input device 1940 (e.g., a computer mouse and/or keyboard to input password information, change management rules and logic, etc.) and/an output device 1950 (e.g., a computer monitor to render a user interface display, transmit alert messages, generate statistics for reports, etc.). According to some embodiments, a mobile device and/or PC may be used to exchange information with the credential change management platform 1900.

The processor 1910 also communicates with a storage device 1930. The storage device 1930 may comprise any appropriate information storage device, including combinations of magnetic storage devices (e.g., a hard disk drive), optical storage devices, mobile telephones, and/or semiconductor memory devices. The storage device 1930 stores a program 1912 and/or a change management engine 1914 for controlling the processor 1910. The processor 1910 performs instructions of the programs 1912, 1914, and thereby operates in accordance with any of the embodiments described herein. For example, the processor 1910 may access a credential data store 1960 containing electronic records associated with security credentials, the electronic records including at least a prior credential expiring at time T1 and a new credential effective beginning at time T1. The processor 1910 may, during a first transitional time period from time T1 to time T2: deny access by remote client devices that submit credentials other than the prior credential or the new credential (and, as a result of the denial, increment a lock-out counter), and allow access by remote client devices that submit either the prior credential or the new credential. During a second transitional time period from time T2 to time T3, the processor 1910 may: deny access by remote client devices that submit credentials other than the prior credential or the new credential (and, as a result of the denial, increment the lock-out counter), deny access by remote client devices that submit the prior credential without incrementing the lock-out counter, and allow access by remote client devices that submit the new credential. During a third time period after time T3, the processor 1910 may: deny access by remote client devices that submit credentials other than the new credential (and, as a result of the denial, increment the lock-out counter), and allow access by remote client devices that submit the new credential.

The programs 1912, 1914 may be stored in a compressed, uncompiled and/or encrypted format. The programs 1912, 1914 may furthermore include other program elements, such as an operating system, clipboard application, a database management system, and/or device drivers used by the processor 1910 to interface with peripheral devices.

As used herein, information may be "received" by or "transmitted" to, for example: (i) the monitoring and control platform 1900 from another device; or (ii) a software application or module within the credential change management platform 1900 from another software application, module, or any other source.

In some embodiments (such as the one shown in FIG. 19), the storage device 1930 further stores the credential data store 1960, an IP client database 1970, and a management database 2000. An example of a database that may be used in connection with the credential change management platform 1900 will now be described in detail with respect to FIG. 20. Note that the database described herein is only one example, and additional and/or different information may be stored therein. Moreover, various databases might be split or combined in accordance with any of the embodiments described herein.

Figure 20:
FIG. 20 is a tabular portion of an inspection information database according to some embodiments.

Referring to FIG. 20, a table is shown that represents the management database 2000 that may be stored at the credential change management platform 1900 according to some embodiments. The table may include, for example, entries identifying login attempts associated with a service in accordance with any of the embodiments described herein. The table may also define fields 2002, 2004, 2006, 2008, 2010, 2012, 2014 for each of the entries. The fields 2002, 2004, 2006, 2008, 2010, 2012, 2014 may, according to some embodiments, specify: a login attempt identifier 2002, a client identifier 2004, submitted passwords 2006, password evaluation 2008, a time period 2010, a result 2012, and a failed login counter 2014. The management database database 2000 may be created and updated, for example, when login attempts are received at a service or management console.

The login attempt identifier 2002 may be, for example, a unique alphanumeric code identifying a user name and password submitted by the client identifier 2004 (and, in some embodiments, when the attempt occurred). The submitted password 2006 might comprise a password string and password evaluation 2008 might indicate if the submitted password 2006 represented a current password, an old password, or an unknown credential. The time period 2010 might indicate if the system is currently accepting both old and new passwords and/or whether a failed login counter should be incremented. The result 2012 might indicate if the login attempt was successful and the failed login counter 2014 might indicate whether or not the counter was incremented (and, when exceeding a limit, creating an automatic account lockout).

Thus, some embodiments may provide systems and methods to facilitate management of security credential changes in an accurate and efficient fashion. Moreover, embodiments may be less as compared to other approaches. For example, it may be less likely that a service is locked for all consumers, because the "invalid login counter" can only reach the maximum limit upon a "really invalid login" not using "yesterday's credentials." Moreover, the amount of downtime for consumers may be reduced. Even if the consumers are known and the credentials are changed pro-actively and timely, there may be a period of time during which the client cannot authenticate. Given the increased use of microservice architecture and client authentication, embodiments may increase both security and availability without sacrificing one for the other.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). Moreover, although some embodiments use particular time periods and/or login attempt limits as examples, and other values could be used.

Figure 21:
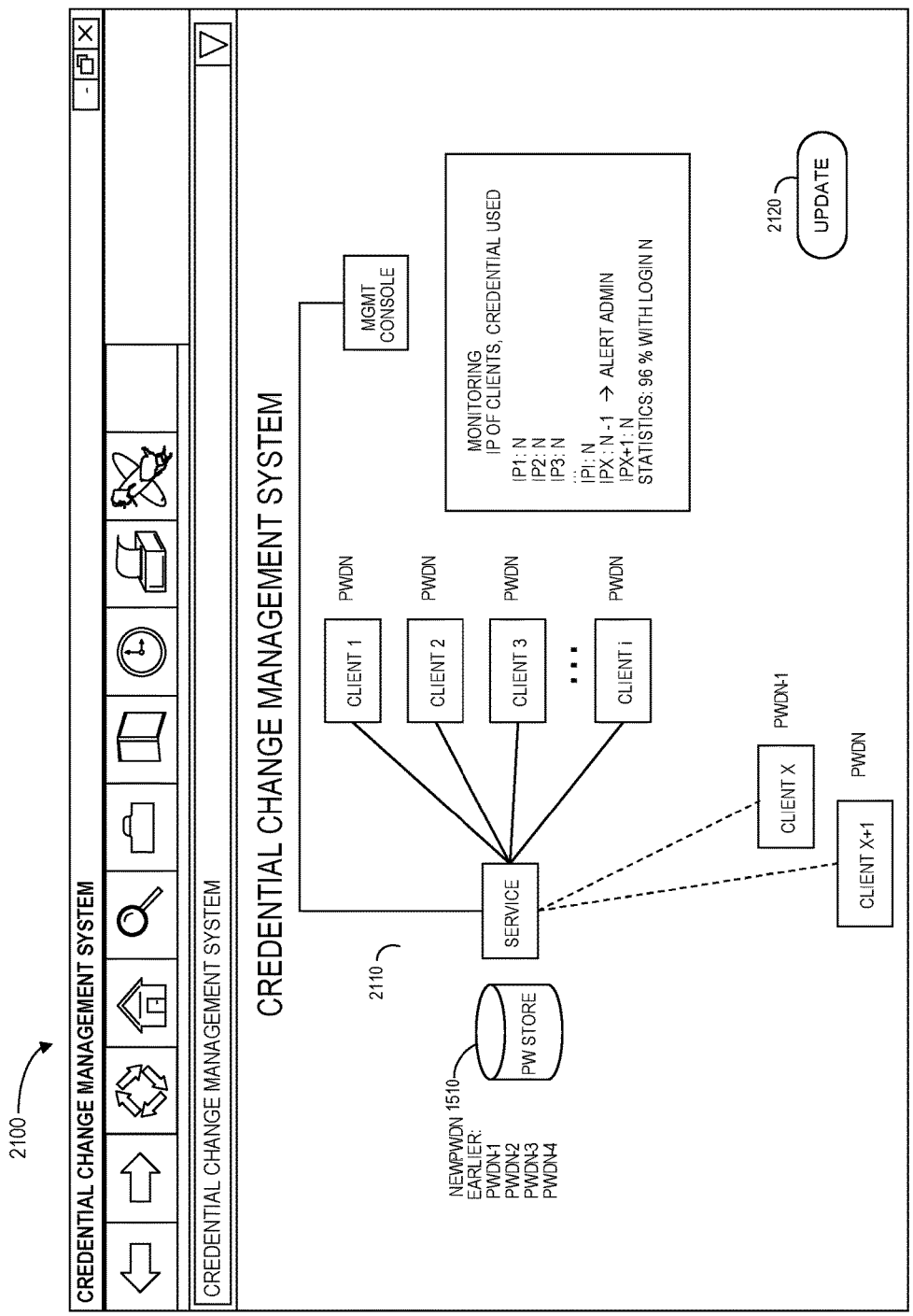
FIG. 21 illustrates a computer displaying an interactive graphical user interface according to some embodiments.
Figure 22:
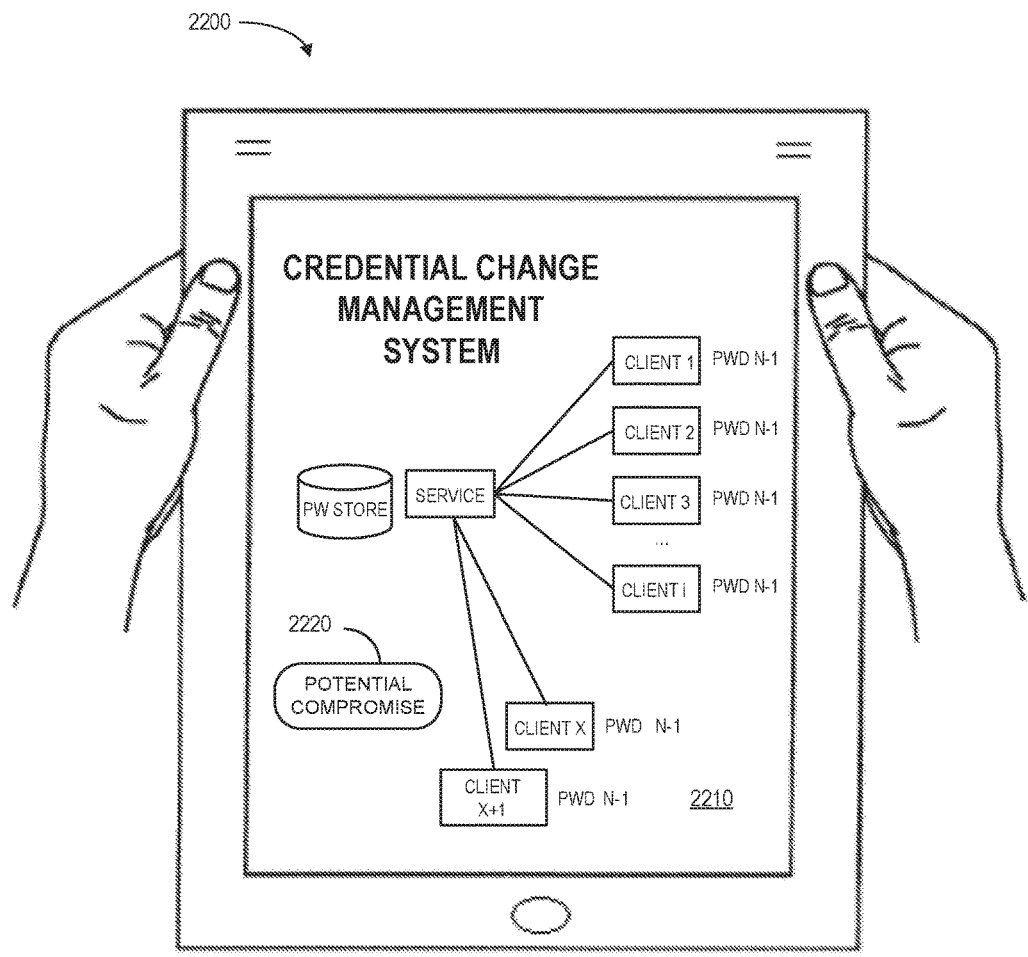
FIG. 22 illustrates a tablet computer displaying an interactive graphical user interface according to some embodiments.

According to some embodiments, the elements of the system 200 support interactive user interface displays over a distributed communication network. For example, FIG. 21 illustrates a computer 2100 displaying an interactive graphical user interface 2110 according to some embodiments. In particular, the display 2110 includes a graphical overview of elements of a credential change management system. Moreover, an icon 2120 may be selected via a computer mouse pointer to initiate a password update, elements may be selectable to receive further information about those elements, etc. As another example, FIG. 22 illustrates a tablet computer 2200 displaying an interactive graphical user interface 2210 according to some embodiments. In particular, the display 2210 includes on overview of a credential change management system. Moreover, the touchscreen of the tablet 2200 may be used to select an icon 2220 that initiates a security procedure when a potential compromise has been detected.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A credential change management system, comprising:
a credential data store containing electronic records associated with security credentials, the electronic records including at least a prior credential expiring at time T1 and a new credential effective beginning at time T1;
a communication port to exchange information with a plurality of remote client devices; and
a credential change management platform, coupled to the credential data store and the communication port, having at least one computer processor operatively coupled to at least one memory, wherein the processor is configured to:
during a first transitional time period from time T1 to time T2:
deny access by remote client devices that submit credentials other than the prior credential or the new credential and, as a result of the denial, increment a lock-out counter, and
allow access by remote client devices that submit either the prior credential or the new credential,
during a second transitional time period from time T2 to time T3:
deny access by remote client devices that submit credentials other than the prior credential or the new credential and, as a result of the denial, increment the lock-out counter,
deny access by remote client devices that submit the prior credential without incrementing the lock-out counter, and
allow access by remote client devices that submit the new credential, and
during a third time period after time T3:
deny access by remote client devices that submit credentials other than the new credential and, as a result of the denial, increment the lock-out counter, and
allow access by remote client devices that submit the new credential,
wherein the at least one processor of the credential change management platform dynamically adjusts the value of time T3 based on a determination that all remote client devices have successfully logged on with the new credential.

2. The credential change management system of claim 1, wherein a remedial security action is taken when the lock-up counter exceeds a pre-determined threshold.

3. The credential change management system of claim 2, wherein the lock-up counter is reset when access by a remote client device is allowed.

4. The credential change management system of claim 1, wherein security credentials are associated with at least one of a username and a password.

5. The credential change management system of claim 1, wherein a reminder message is transmitted to a remote client device that submits the prior credential during the second transitional time period.

6. The credential change management system of claim 5, wherein the reminder message is reported to a central management tracking system.

7. The credential change management system of claim 1, wherein the at least one processor of the credential change management platform is further configured to:
determine that an unauthorized user may have access to the prior credential; and
responsive to the determination, set time T1 to the same value as time T2 such that the duration of the first transition period is zero.

8. The credential change management system of claim 1, wherein T3 is further dynamically adjusted based on a period of time during which no invalid logins with the old credential are detected.

9. The credential change management system of claim 1, wherein the determination is based on Internet Protocol addresses.

10. The credential change management system of claim 1, wherein the dynamic adjustment is performed by a management console.

11. The credential change management system of claim 10, wherein the management console is adapted to automatically transmit an alert message to an administrator upon occurrence of a pre-determined condition.

12. The credential change management system of claim 10, wherein the management console is adapted to generate an audit log.

13. A non-transitory, computer-readable medium storing program code, the program code executable by a processor of a credential change management platform to cause the platform to perform a method for credential change management in a system having a prior credential expiring at time T1 and a new credential effective beginning at time T1 the method comprising:
during a first transitional time period from time T1 to time T2:
denying access by remote client devices that submit credentials other than the prior credential or the new credential and, as a result of the denial, increment a lock-out counter, and
allowing access by remote client devices that submit either the prior credential or the new credential;
during a second transitional time period from time T2 to time T3:
denying access by remote client devices that submit credentials other than the prior credential or the new credential and, as a result of the denial, increment the lock-out counter,
denying access by remote client devices that submit the prior credential without incrementing the lock-out counter, and
allowing access by remote client devices that submit the new credential; and
during a third time period after time T3:
denying access by remote client devices that submit credentials other than the new credential and, as a result of the denial, increment the lock-out counter, and
allowing access by remote client devices that submit the new credential,
wherein the value of time T3 is dynamically adjusted based on a determination that all remote client devices have successfully logged on with the new credential.

14. The medium of claim 13, wherein a reminder message is transmitted to a remote client device that submits the prior credential during the second transitional time period.

15. The medium of claim 13, wherein the method further comprises:
determining that an unauthorized user may have access to the prior credential; and
responsive to the determination, setting time T1 to the same value as time T2 such that the duration of the first transition period is zero.

16. The medium of claim 13, wherein the dynamic adjustment is further based on a period of time during which no invalid logins with the old credential are detected.

17. A method for credential change management in a system having a prior credential expiring at time T1 and a new credential effective beginning at time T1, comprising:

during a first transitional time period from time T1 to time T2:
- denying access by remote client devices that submit credentials other than the prior credential or the new credential and, as a result of the denial, increment a lock-out counter, and
- allowing access by remote client devices that submit either the prior credential or the new credential;

during a second transitional time period from time T2 to time T3:
- denying access by remote client devices that submit credentials other than the prior credential or the new credential and, as a result of the denial, increment the lock-out counter,
- denying access by remote client devices that submit the prior credential without incrementing the lock-out counter, and
- allowing access by remote client devices that submit the new credential; and during a third time period after time T3:
- denying access by remote client devices that submit credentials other than the new credential and, as a result of the denial, increment the lock-out counter, and
- allowing access by remote client devices that submit the new credential, wherein the value of time T3 is dynamically adjusted based on a determination that all remote client devices have successfully logged on with the new credential.

18. The method of claim 17, wherein a remedial security action is taken when the lock-up counter exceeds a predetermined threshold.

19. The method of claim 17, wherein the lock-up counter is reset when access by a remote client device is allowed.

20. The method of claim 17, wherein security credentials are associated with at least one of a username and a password.

* * * * *